US012778125B2

(12) United States Patent
Readnour et al.

(10) Patent No.: US 12,778,125 B2
(45) Date of Patent: *Nov. 3, 2026

(54) ORAL CANINE FEED AND METHODS FOR CONTROLLING TICK INFESTATIONS IN A CANINE

(71) Applicant: In the Bowl Animal Health, Inc., Nashville, TN (US)

(72) Inventors: Robin S. Readnour, Nashville, TN (US); Kevin E. Willard, Knightstown, IN (US); Joseph R. Winkle, Carmel, IN (US)

(73) Assignee: In the Bowl Animal Health Inc., Nashville, TN (US)

( * ) Notice: Subject to any disclaimer, the term of this patent is extended or adjusted under 35 U.S.C. 154(b) by 281 days.

This patent is subject to a terminal disclaimer.

(21) Appl. No.: 18/464,222

(22) Filed: Sep. 10, 2023

(65) Prior Publication Data

US 2023/0413822 A1 Dec. 28, 2023

Related U.S. Application Data

(63) Continuation of application No. PCT/US2022/019889, filed on Mar. 11, 2022.

(60) Provisional application No. 63/159,760, filed on Mar. 11, 2021.

(51) Int. Cl.
*A01N 43/76* (2006.01)
*A01P 17/00* (2006.01)

(52) U.S. Cl.
CPC .............. *A01N 43/76* (2013.01); *A01P 17/00* (2021.08)

(58) Field of Classification Search
CPC ................................ A01N 43/76; A01P 17/00
See application file for complete search history.

(56) References Cited

U.S. PATENT DOCUMENTS

| | | | |
|---|---|---|---|
| 3,968,207 | A | 7/1976 | Schrider |
| 5,098,914 | A | 3/1992 | Rehmert, Jr. |
| 8,784,885 | B2 | 7/2014 | Akiyama et al. |
| 8,889,710 | B2 | 11/2014 | An et al. |
| 9,255,111 | B2 | 2/2016 | An et al. |
| 9,655,884 | B2 | 5/2017 | Williams et al. |
| 9,770,440 | B2 | 9/2017 | Freehauf et al. |
| 2003/0139459 | A1 | 7/2003 | Tinembart et al. |
| 2012/0029043 | A1 | 2/2012 | Derrieu |
| 2012/0238517 | A1 | 9/2012 | Cassayre et al. |
| 2013/0131017 | A1 | 5/2013 | Akama et al. |
| 2014/0107149 | A1 | 4/2014 | An et al. |
| 2015/0111936 | A1 | 4/2015 | Heckeroth et al. |
| 2016/0303086 | A1 | 10/2016 | Williams et al. |
| 2016/0303088 | A1 | 10/2016 | Desai et al. |
| 2017/0100377 | A1 | 4/2017 | Freehauf et al. |
| 2017/0311601 | A1 | 11/2017 | Yang et al. |

FOREIGN PATENT DOCUMENTS

| | | | | |
|---|---|---|---|---|
| EP | 0412849 A2 | | 2/1991 | |
| JP | 2014-515347 A | | 6/2014 | |
| WO | WO-2005041950 A1 | * | 5/2005 | A61K 31/415 |
| WO | 2010/129491 A1 | | 11/2010 | |
| WO | 2012/158396 A1 | | 11/2012 | |
| WO | WO-2012155676 A1 | * | 11/2012 | A61P 33/00 |
| WO | 2013/119442 A1 | | 8/2013 | |
| WO | WO-2013150052 A1 | * | 10/2013 | A61P 33/12 |
| WO | 2020/051106 A1 | | 3/2020 | |
| WO | WO-2020201440 A1 | * | 10/2020 | A61K 31/42 |

OTHER PUBLICATIONS

CAS 1414642-93-5 Mivorilaner—BOC Sciences (Year: 2025).*
Tigolaner _ C21H13ClF8N6O (Year: 2025).*
International Preliminary Report on Patentability for PCT/US2022/019877, Sep. 21, 2023 (8 pages).
International Search Report and Written Opinion for PCT/US2022/019877, Jun. 29, 2022 (11 pages).
International Preliminary Report on Patentability for PCT/US2022/019889, Sep. 21, 2023 (8 pages).
International Search Report and Written Opinion for PCT/US2022/019889, Jul. 1, 2022 (11 pages).
International Preliminary Report on Patentability, PCT/US2022/034704, Jan. 4, 2024, 9 pages.
International Search Report and Written Opinion, PCT/US2022/034704, Dec. 12, 2022, 9 pages.
International Preliminary Report on Patentability, PCT/US2022/034746, Jan. 4, 2024, 8 pages.
International Search Report and Written Opinion, PCT/US2022/034746, Sep. 29, 2022, 14 pages.
Hoffman, Dry Dog Food vs. Wet Dog Food: Which is Better?, Jan. 8, 2021, PetMD, https://www.petmd.com/dog/nutrition/dry-dog-food-vs-wet-dog-food-which-better.
Fixemclinic, www.fixemclinic.org/blog/medication (Year: 2018).

* cited by examiner

*Primary Examiner* — Robert A Wax
*Assistant Examiner* — John W Lippert, III
(74) *Attorney, Agent, or Firm* — Bose McKinney and Evans LLP

(57) ABSTRACT

An oral canine feed and a method of controlling ticks in a canine in need thereof by orally administering to the canine an effective amount of a isoxazoline for an effective time to thereby cause the amount of isoxazoline in the canine's blood to rise to and maintain at a therapeutically effective level for controlling ticks.

18 Claims, 11 Drawing Sheets

ORAL CANINE FEED AND METHODS FOR CONTROLLING TICK INFESTATIONS IN A CANINE

RELATED APPLICATIONS

This application is a continuation of International Patent Application No. PCT/US2022/019889, filed Mar. 11, 2022, which claims priority to U.S. Provisional Patent Application No. 63/159,760, filed Mar. 11, 2021, both of which are hereby incorporated herein by reference.

TECHNICAL FIELD

The teachings of this disclosure generally relate to an isoxazoline, a canine feed or chew that includes the isoxazoline and a method of administering the isoxazoline to control tick infestations in canines.

BACKGROUND AND SUMMARY

Globally, dog ownership has increased to around 471 million dogs being kept as household pets. Ticks are common ectoparasites of dogs worldwide and ticks are known to transmit bacterial and viral diseases.

The health related risks of tick infestations in dogs extend to humans. [Center for Disease Control and Prevention, Illnesses on the Rise, Vital Signs, May, 2018, available at https://www.cdc.gov/vitalsigns/vector-borne/] Infested canines expose their human owners to increased risk of illness. One of the recommended ways to control human risk from ticks is to control the risk of infestation in dogs.

Treatments currently available for controlling tick infestations in canines achieve varying degrees of success. Many treatments involve chemicals applied to indoor and outdoor surfaces, as well as to the canine. The chemicals used include a variety of carbamates, organophosphates, certain macrocyclic lactones, fiproles, pyrethrins and pyrethroids. These compounds often have toxic side effects that are a problem for both the canine and its owner. In addition, there is evidence that the use of these chemicals may be ineffective due to acaricide resistance and treatment deficiencies.

Topical treatments are a well-known method for controlling tick infestations in canines. While there are numerous ways to deliver these therapeutic agents to the coats and skins of canines, many of these methods are either ineffective and/or present safety risks to the canine or user during or after the dispensing activity. More particularly, because a physical connection must be achieved between the applicator tip and the drug delivery device when the applicator tip is installed thereon, there is inherently a risk that the connection will be inadequate, thereby permitting some of the therapeutic agent to leak out of the device and into physical contact with the user. For example, in the case of larger canines, it may be difficult to maneuver the dispenser with one hand and maintain the canine in place with the other hand, resulting in some, if not all, of the substance being spilled on the floor or on the person applying it instead of reaching the canine's skin. Not only is this leakage wasteful and messy, it also places the user at a heightened risk of suffering from a skin irritation or other such health concern, particularly if the user comes into direct contact with the agent.

Oral treatments are also available. However, to be effective, the canine owner must administer a treatment once every 30-90 days, for example. The extended time between treatments creates compliance issues when owners forget to administer doses.

Despite the availability of effective treatments, a recent study by The Harris Poll found that 33% of pet owners do not routinely protect their pets against ticks at all. Another study found that pet owners purchased, on average, only 4 months of tick prevention products per year per pet, despite being told that pets needed to be given tick prevention treatments year-round. Thus, there continues to be a need for relatively safe, effective agents for controlling tick infestations on canines that is easier for owners to remember to use.

Surprisingly, it has been discovered by the inventors that isooxazolines can provide improved control over tick infestations in canines when orally administered in smaller, more frequent/chronic doses. The administration is discussed below as being combined with feed. However, it is also contemplated that the isoxazoline may be administered by itself or in a dosage form other than feed, such as a chew, tablet, liquid, gel or other suitable form for oral administration. Advantageously, by using smaller, more frequent doses, less total isoxazoline is required over the same time period to control tick infestations. Assume, for example, that 6.25 mg of isoxazoline/kg of canine body weight is needed for a single dose in a 30-day (1-month) period according to the prior art approach to reach and maintain a therapeutically effective concentration of isoxazoline in the canine's blood for continued tick control. With the inventive approach of smaller and more frequent doses, as little as 0.04-0.1875 mg of isoxazoline/kg of canine body weight may be needed per day, or 1.25-5.625 of isoxazoline/kg of canine body weight cumulative over the same 30-day period.

Advantageously, the total amount of isoxazoline required for a therapeutically effective once-monthly dose can be reduced by 10-87.5% by converting to daily administration. However, from a practical perspective, at least two problems arise: (1) creating a homogenous feed; and (2) analytical control testing for a very small dose of isoxazoline may be difficult to accomplish. The analytical matrix from feeds can be quite complex and difficult to assay. Assays will be in the parts per million to billion range for some needed dose and feed concentrations. Thus, it is possible that one of skill in the art may opt to increase the daily dose such that the total of the daily doses over the course of one month equals the prior art once-monthly dose or is even higher, for example, 200% of the prior art once-monthly dose. This may be done to help ensure homogeneity as well as increase assay accuracy and decrease analytical variability when administering the dose as part of a daily feed.

The method and composition taught herein have the further advantage of encouraging compliance because the smaller doses of an isoxazoline can be incorporated into a feed. Since owners naturally follow a daily feeding regimen in any event, this makes it less likely that owners will forget or neglect to administer the treatment. Thus, this disclosure provides a method for prolonged control of ticks in a safer and more effective manner than that achieved with previously known treatment methodologies. All the owner need remember is to feed their pet as they normally would.

Further, the bioavailability of certain isooxazolines can be improved by administering them with feed. Thus, this disclosure provides a method for prolonged control of ticks in a safer and more effective and convenient manner than that achieved with previously known treatments.

Isooxazolines are a class of five-membered heterocyclic chemical compounds, containing one atom each of oxygen and nitrogen which are located adjacent to one another.

Isooxazolines are all derivatives of isoxazole. They are structural isomers of the more common oxazolines and exist in three different isomers depending on the location of the double bond.

Isoxazoline derivatives are known. For example, WO2007/105814, WO2008/122375, and WO2009/035004 disclose certain alkylene linked amides. WO2010/032437 discloses that the benzyl amide can be moved to the position ortho to the isoxazoline. WO2007/075459 discloses phenyl isooxazolines substituted with 5- to 6-membered heterocycles, and WO2010/084067 and WO2010/025998 disclose phenyl isooxazolines substituted with 10- to 11-membered fused aryl and heteroaryls. Chiral processes for manufacturing isooxazolines are disclosed in WO2011/104089 and WO2009/063910.

A number of isooxazolines compounds are known, including but not limited to 4-(5-methyl-5-substituted pyrrolyl-4,5-dihydroisoxazole-3-yl) benzoic acid amide derivatives, 4-(5-substituted carbamoylmethyl-4,5-dihydroisoxazole-3-yl) benzoic acid amide derivatives; 3-(5-substituted carbamoylmethyl-5-substituted alkyl-4,5-dihydroisoxazole-3-yl) benzoic acid amide derivatives, 4-(5-substituted carbamoylmethyl-4,5-dihydroisoxazole-3-yl) benzamidine derivatives; 4-(5-substituted-5-substituted aryl-4,5-dihydroisoxazole-3-yl)benzoic acid amide compounds, 3-(4-substituted phenyl)-4,5-dihydroisoxazole derivatives; 5-substituted alkyl-3,5-bis substituted phenyl-4,5-dihydroisoxazole derivatives; 3-alkoxyphenyl-5-substituted-5-phenyl-4,5-dihydroisoxazole derivatives; 3-alkoxyphenyl-5-substituted alkyl-5-substituted carbamoyl-4,5-dihydroisoxazole derivatives; 3-(4-halophenyl)-5-substituted-5-substituted phenyl-4,5-dihydroisoxazole derivatives; 3-(4-nitrophenyl)-5-substituted-5-substituted phenyl-4,5-dihydroisoxazole derivatives; 4-hydroxyiminomethyl benzoic acid amide derivatives; 4-hydroxyiminomethyl-N,N-dimethyl benzoic acid amide; 4-hydroxyiminomethyl benzoyl piperidine derivatives; 4-hydroxyiminomethyl-N-bicycloalkyl benzoic acid amide derivatives; 6-(hydroxyiminomethyl)pyridine-2-carboxamide derivatives; haloalkenylbenzene derivatives, such as substituted 3,3,3-trifluoro-2-propenylbenzene derivatives; 4-(isoxazolinyl)-benzamides, such as substituted 4-(5-(halomethyl)-5-phenyl-isoxazolin-3-yl)-benzamides; 4-(isoxazolinyl)-benzothioamides, such as substituted 4-(5-(halomethyl)-5-phenyl-isoxazolin-3-yl)-benzothioamides; dihydroisoxazole compounds; and spirocyclic substituted isooxazolines.

Isooxazolines of particular interest for controlling tick infestations in canines are afoxolaner (chemical names: (a) 1-Naphthalenecarboxamide, 4-[5-[3-chloro-5-(trifluoromethyl)phenyl]-4,5-dihydro-5-(trifluoromethyl)-3-isoxazolyl]-N-[2-oxo-2-[(2,2,2-trifluoroethyl)amino]ethyl]-; or (b) 4-{5-[3-chloro-5-(trifluoromethyl)phenyl]-5-(trifluoromethyl)-4,5-dihydroisoxazol-3-yl}-N-{2-oxo-2-[(2,2,2-trifluoroethyl)amino]ethyl}naphthalene-1-carboxamide), fluralaner (chemical names: (a) Benzamide, 4-[5-(3,5-dichlorophenyl)-4,5-dihydro-5-(trifluoromethyl)-3-isoxazolyl]-2-methyl-N-[2-oxo-2-[(2,2,2-trifluoroethyl)amino]ethyl]-; or (b) 4-[5-(3,5-dichlorophenyl)-5-(trifluoromethyl)-4,5-dihydro-1,2-oxazol-3-yl]-2-methyl-N-{2-oxo-2-[(2,2,2-trifluoroethyl)amino]ethyl}benzamide), sarolaner (chemical names: (a) Ethanone, 1-[5'-[(5S)-5-(3,5-dichloro-4-fluorophenyl)-4,5-dihydro-5-(trifluoromethyl)-3-isoxazolyl]spiro[azetidine-3,1'(3'H)-isobenzofuran]-1-yl]-2-(methylsulfonyl)-; or (b) 1-{5'-[(5S)-5-(3,5-dichloro-4-fluorophenyl)-5-(trifluoromethyl)-4,5-dihydroisoxazol-3-yl]-3'-H-spiro[azetidine-3,1'-[2]benzofuran]-1-yl}-2-(methylsulfonyl)ethanone), lotilaner (chemical names: (a) 2-Thiophenecarboxamide, 5-[(5S)-4,5-dihydro-5-(3,4,5-trichlorophenyl)-5-(trifluoromethyl)-3-isoxazolyl]-3-methyl-N-[2-oxo-2-[(2,2,2-trifluoroethyl)amino]ethyl]-; or (b) 3-methyl-N-{2-oxo-2-[(2,2,2-trifluoroethyl)amino]ethyl}-5-[(5S)-5-(3,4,5-trichlorophenyl)-5-(trifluoromethyl)-4,5-dihydro-1,2-oxazol-3-yl]thiophene-2-carboxamide), esafoxolaner (chemical names: (a) 1-Naphthalenecarboxamide, 4-[(5S)-5-[3-chloro-5-(trifluoromethyl)phenyl]-4,5-dihydro-5-(trifluoromethyl)-3-isoxazolyl]-N-[2-oxo-2-[(2,2,2-trifluoroethyl)amino]ethyl]-; or (b) (S)-4-(5-(3-chloro-5-(trifluoromethyl)phenyl)-5-(trifluoromethyl)-4,5-dihydroisoxazol-3-yl)-N-(2-oxo-2-((2,2,2-trifluoroethyl)amino)ethyl)-1-naphthamide), tigolaner (chemical names: (a) Benzamide, 2-chloro-N-(1-cyanocyclopropyl)-5-[1'-methyl-3'-(1,1,2,2,2-pentafluoroethyl)-4'-(trifluoromethyl)[1,5'-bi-1H-pyrazol]-4-yl]-; or (b) 2-chloro-N-(1-cyanocyclopropyl)-5-[2'-methyl-5'-(pentafluoroethyl)-4'-(trifluoromethyl)-2'H-[1,3'-bipyrazol]-4-yl]benzamide), umifoxolaner (chemical names: (a) 1-Naphthalenecarboxamide, 4-[(5S)-5-[3-chloro-4-fluoro-5-(trifluoromethyl)phenyl]-4,5-dihydro-5-(trifluoromethyl)-3-isoxazolyl]-N-[2-oxo-2-[(2,2,2-trifluoroethyl)amino]ethyl]-; or (b) 4-{(5S)-5-[3-chloro-4-fluoro-5-(trifluoromethyl)phenyl]-5-(trifluoromethyl)-4,5-dihydroisoxazol-3-yl}-N-{2-oxo-2-[(2,2,2-trifluoroethyl)amino]ethyl}naphthalene-1-carboxamide), modoflaner (chemical name: 6-fluoro-N-(2-fluoro-3-{[4-(heptafluoropropane-2-yl)-2-iodo-6-(trifluoromethyl)phenyl]carbamoyl}phenyl)pyridine-3-carboxamide) and mivorilaner (chemical names: (a) 4H-Cyclopenta[c]thiophene-1-carboxamide, 3-[(5S)-5-(3,5-dichloro-4-fluorophenyl)-4,5-dihydro-5-(trifluoromethyl-3-isoxazolyl]-N-[2-[(2,2-difluoroethyl)amino]-2-oxoethyl]-5,6-dihydro-); or (b) 3-[(5S)-5-(3,5-dichloro-4-fluorophenyl)-5-(trifluoromethyl)-4,5-dihydroisoxazol-3-yl]-N-[2-[(2,2-difluoroethyl)amino]-2-oxoethyl]-5,6-dihydro-4H-cyclopenta[c]thiophene-1-carboxamide).

More particularly, isooxazolines with the following structures are suitable for the methods and formulations of this disclosure:

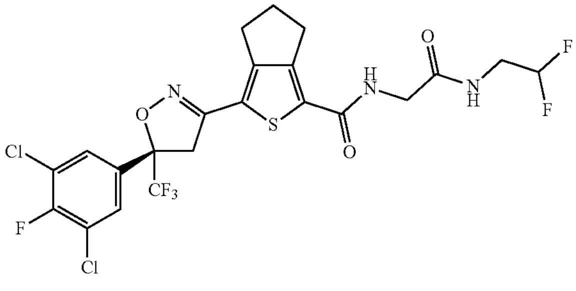

[Mivorilaner]

-continued

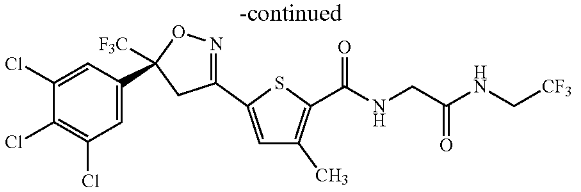

[Lotilaner]

Isooxazolines can react to form salts that are also useful in the methods and formulations of this disclosure. The salts may be prepared using standard procedures for salt preparation. For example, suitable salts can be acid addition salts such as hydrohalogenated acids, e.g., hydrofluoric acid, hydrochloric acid, hydrobromic acid and hydroiodide, nitric acid, sulfuric acid, phosphoric acid, chloric acid, perchloric acid, salts of sulfonic acids, e.g., methanesulfonic acid, ethanesulfonic acid, trifluoromethanesulfonic acid, benzenesulfonic acid, p-toluenesulfonic acid, salts of carboxylic acids, e.g., valeric acids, formic acid, acetic acid, propionic acid, trifluoroacetic acid, fumaric acid, tartaric acid, oxalic acid, maleic acid, malic acid, succinic acid, benzoic acid, mandelic acid, ascorbic acid, lactic acid, gluconic acid, citric acid or salts of amino acids, e.g., glutamic acid and aspartic acid. Alternatively, metal salts are also suitable for the present disclosure. For example, alkali metal salts, e.g., lithium, sodium and potassium, and alkaline earth metals, e.g., calcium, barium and magnesium, or salts of aluminum.

The terms "isoxazoline" and "isoxazoline or a derivative thereof" as used herein refer to any isoxazoline, isoxazoline derivative, a salt thereof, a metabolite thereof, or a combination thereof.

Isooxazolines also provide advantages because they are very effective against ticks with post-treatment residual protection when orally administered in smaller, more frequent/chronic doses. Furthermore, isooxazolines have no known acaricidal cross-resistance to existing compounds. Thus, they are especially useful against tick populations on canines that have existing levels of resistance to currently used products. Isooxazolines, therefore, can be used in integrated pest management (IPM) programs to extend the lifeline of commonly used products where resistance is not well developed or has not yet developed.

Systemic efficacy (e.g., ingestion of blood containing isooxazolines by ticks) provides a different mode of exposure compared to topically applied formulations where contact with the tick at the skin surface is the mode of exposure. The advantages of oral systemic treatments and killing of ticks from their ingestion of blood, compared to topical applications and contact killing, include:

a) reduced exposure to the human applicator and children and objects in the canine's environment (e.g., flooring, carpets, furniture);
b) no worry about loss from exposure of the canine to water (lakes, streams, bathing, etc.) or from loss due to rubbing;
c) no concern about UV exposure and degradation;
d) no problems with oxidation from oils on skin, etc.; and
e) assurance that the entire dose is administered (compared to a topical application where some of the dose may drip off, rub off and/or remain in the dispensing tube immediately after treatment).

The formulations, or feeds, and methods of this disclosure may further include, in combination with the isoxazoline, one or more other active substances having therapeutic efficacy. Such active substances include agents efficacious against ticks. Active substances may include, for example, spinosyns, certain macrocyclic lactones, tick specific chitin synthesis inhibitors, pyridines and pyrazoles or fiproles.

The methods of this disclosure are carried out by administering the isoxazoline to the canine in small, frequent doses. To facilitate routine dosing, the isoxazoline administration may be carried out using a feed or chew. A number of different feeds are envisioned, provided the manufacturing process(es) and feed compositions do not have deleterious effects related to efficacy and safety on the isoxazoline and, if applicable, other active substances. For example, feeds and snacks, treats or supplemental feeds in the broad categories of dry, semi-moist, canned-retorted feeds or fresh refrigerated feeds may be adapted for use with this disclosure. The canine receives a maintenance quantity of isoxazoline by consuming the feed product on a weekly, semi-weekly or daily basis.

By incorporating smaller doses of isoxazoline into an animal feed composition and administering it at an effective rate (most preferably daily), the blood level of isoxazoline rises over time until it reaches an optimal steady state where it can be maintained by a daily or substantially daily dosage. By contrast, when isoxazoline is orally administered in larger doses at lower frequency, e.g., a single treatment of a large dose that is administered via "treat" once in a 30-day period, the level of isoxazoline in the blood spikes shortly after dose administration and then declines until the next dose is administered. The administration of a large dose at low frequency means that the canine must consume more isoxazoline in each dose so that the blood level of isoxazoline does not fall below the necessary level for effective protection before the next dose.

Group 4, 0.5 mg of mivorilaner/kg of animal body mass/day (triangles); and Group 5, 1.0 mg of mivorilaner/kg of animal body mass/day (diamonds).

Figure 5A:
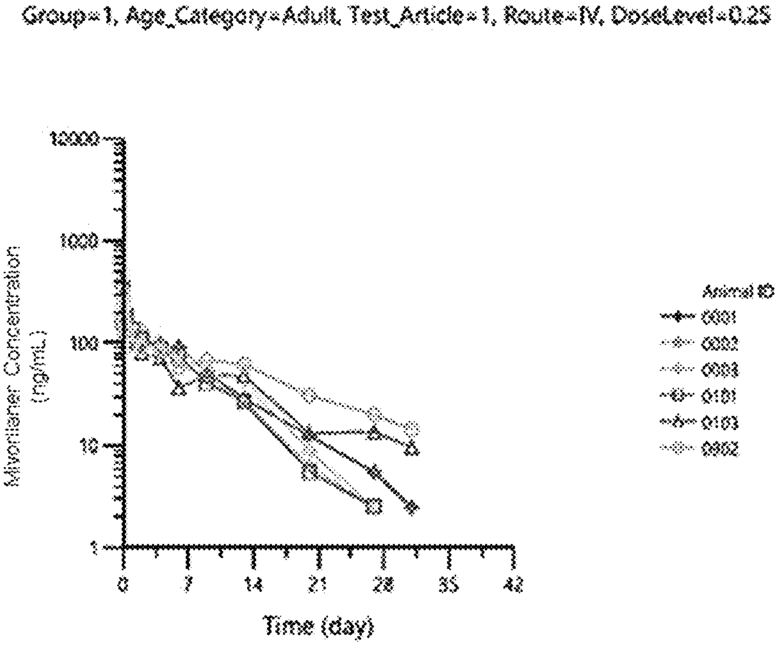

FIG. 5*a*. Graph of level of mivorilaner in the plasma of the individual adult canines in Group 1. Canines were treated with 0.25 mg of mivorilaner/kg body weight of the canine administered by IV. Plasma concentration expressed in units of ng of mivorilaner/mL plasma versus time in days for specific canines.

Figure 5B:
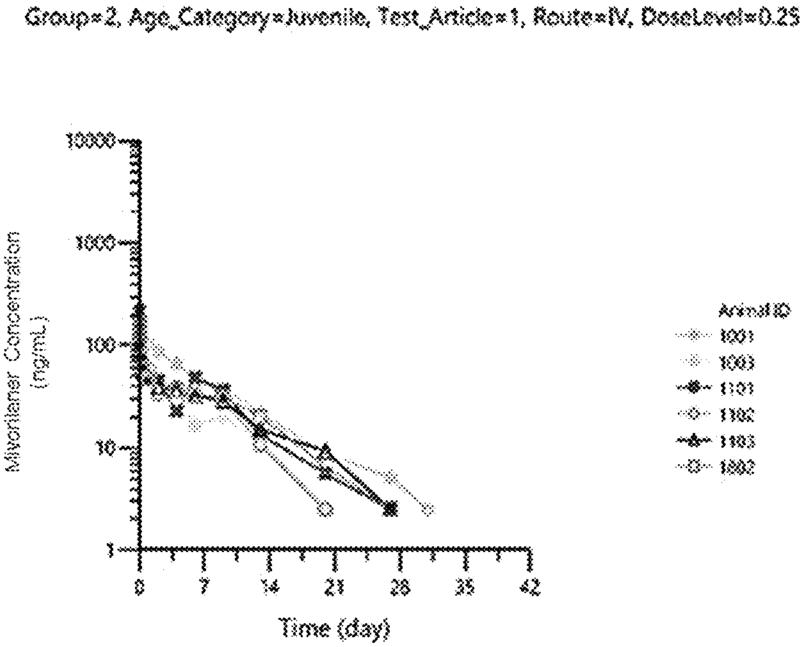

FIG. 5*b*. Graph of level of mivorilaner in the plasma of the individual juvenile canines in Group 2. Canines were treated with 0.25 mg of mivorilaner/kg body weight of the canine administered by IV. Plasma concentration expressed in units of ng of mivorilaner/mL plasma versus time in days for specific canines.

Figure 5C:
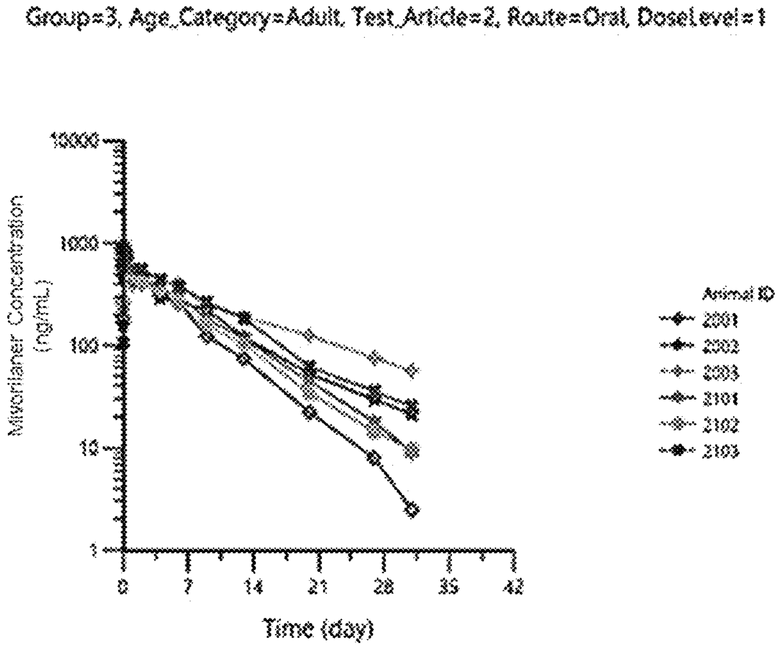

FIG. 5*c*. Graph of level of mivorilaner in the plasma of the individual adult canines in Group 3. Canines were treated with 1.0 mg of mivorilaner/kg body weight of the canine administered orally. Plasma concentration expressed in units of ng of mivorilaner/mL plasma versus time in days for specific canines.

Figure 5D:
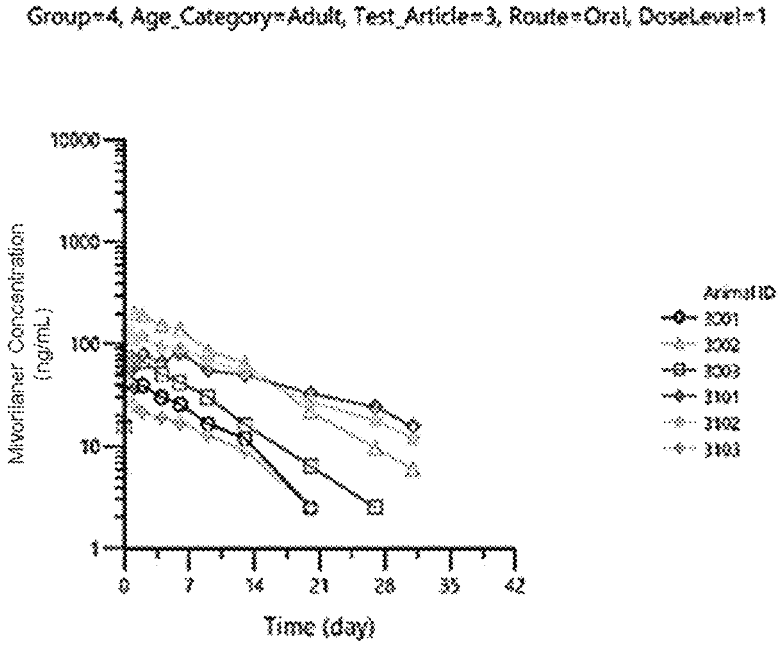

FIG. 5*d*. Graph of level of mivorilaner in the plasma of the individual adult canines in Group 4. Canines were treated with 1.0 mg of mivorilaner/kg body weight of the canine administered orally. Plasma concentration expressed in units of ng of mivorilaner/mL plasma versus time in days for specific canines.

Figure 6:
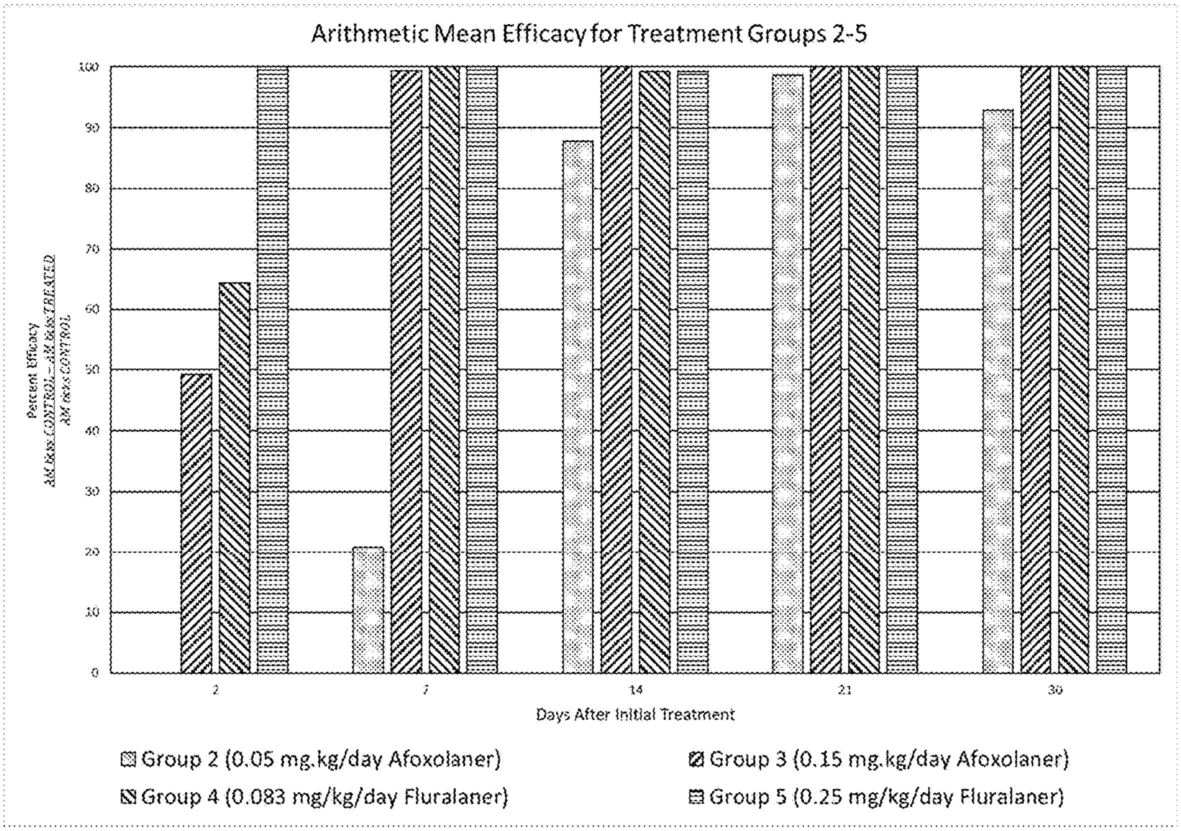

FIG. 6. A graph of the Arithmetic Mean Efficacy. Percent Efficacy=[AM ticks CONTROL−AM ticks TREATED]/AM ticks Control Efficacy is plotted versus time in days. Data collected from Groups 2-5: 0.05 mg of Afoxolaner/kg of animal body mass/day (Group 2, stars); 0.15 mg of Afoxolaner/kg of animal body mass/day (Group 3, right hash); 0.083 mg of Fluralaner/kg of animal body mass/day (Group 4, left hash); and 0.25 mg of Fluralaner/kg of animal body mass/day (Group 5, horizontal hash). Comb counts conducted at 2, 7, 14, 21 and 30 days after the initial treatment.

Figure 7:
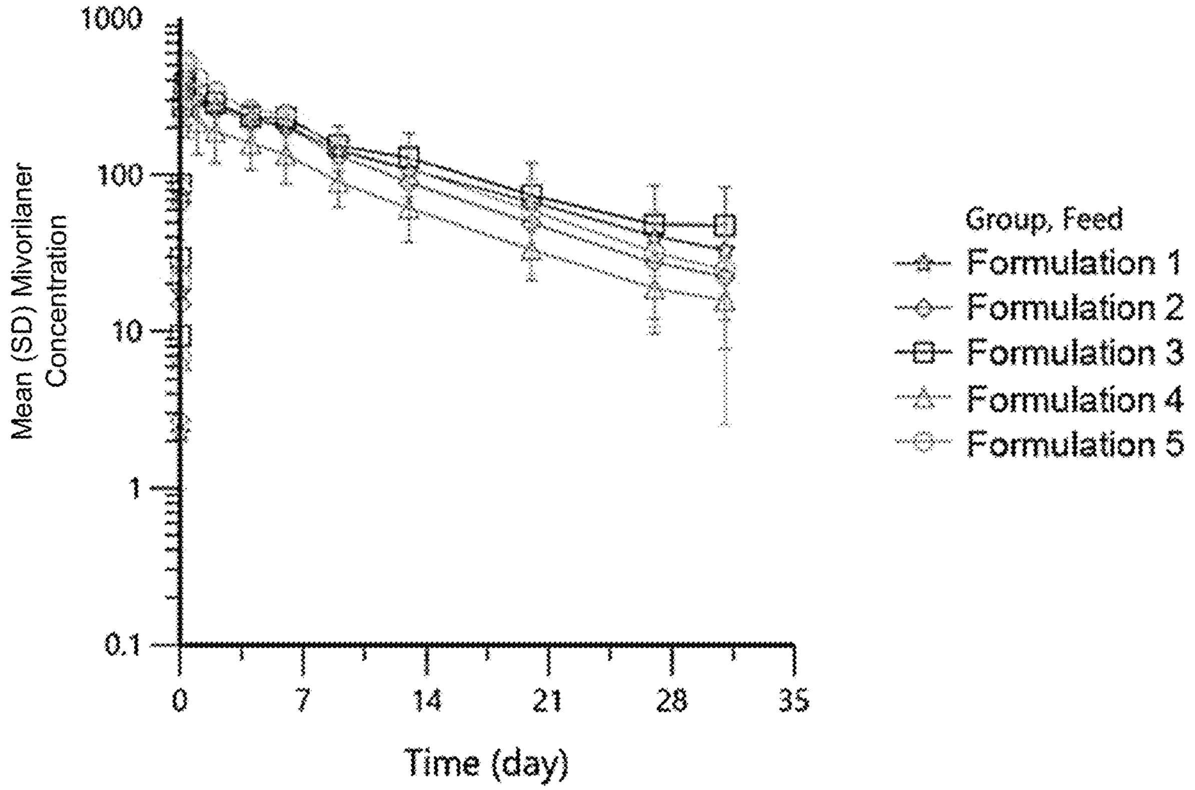

FIG. 7. Graph of Mean (SD) Mivorilaner in ng/mL versus time (days) after a single oral dose of mivorilaner. Plasma levels measured in animals dosed with 1 mg of mivorilaner/kg of body mass with five different formulations of kibble (formulations 1, 2, 3, 4, and 5).

Figure 8:
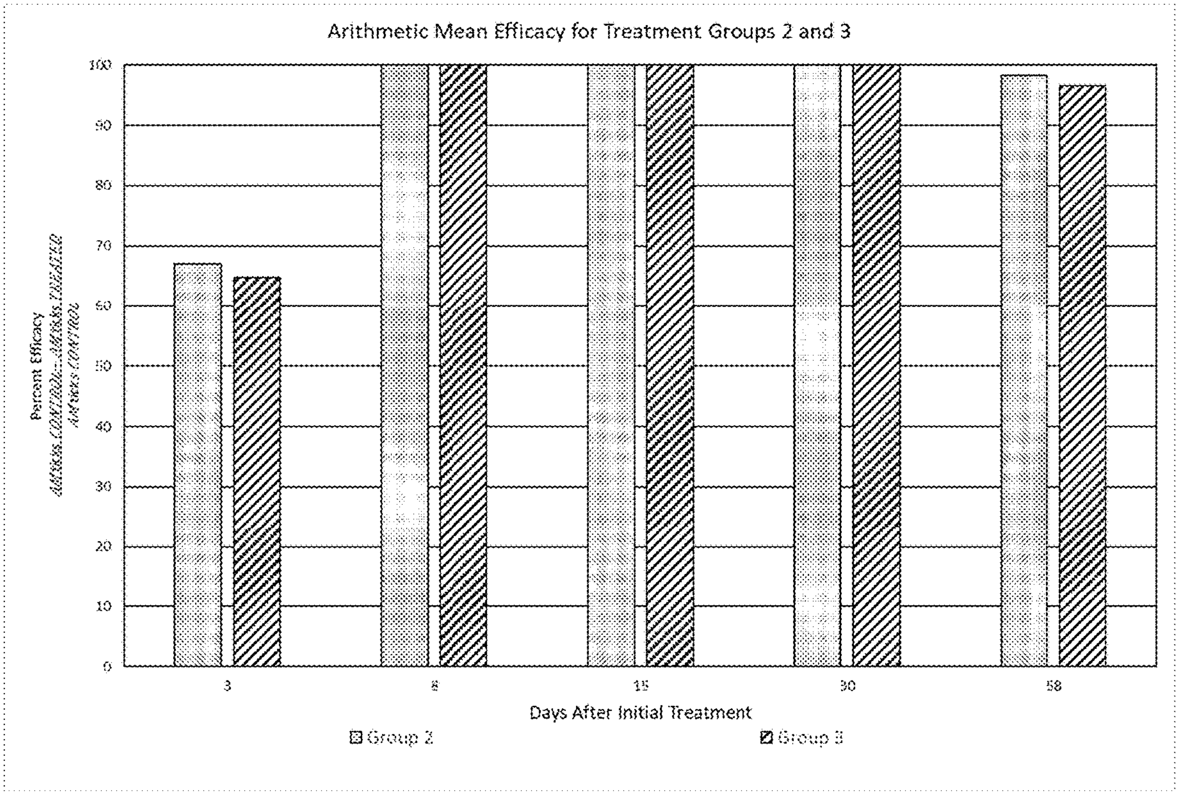

FIG. 8. A graph of the Arithmetic Mean Efficacy. Percent Efficacy=[AM ticks CONTROL−AM ticks TREATED]/AM ticks Control Efficacy is plotted versus time in days. Data collected from Groups 2-3: 1.0 mg of Mivorilaner/kg of animal body mass/day (Group 2, stars); 1.0 mg of Mivorilaner/kg of animal body mass/day (Group 3, right hash) Comb counts conducted at 3, 8, 15, 30, and 58 days after treatment with mivorilaner.

Figure 9:
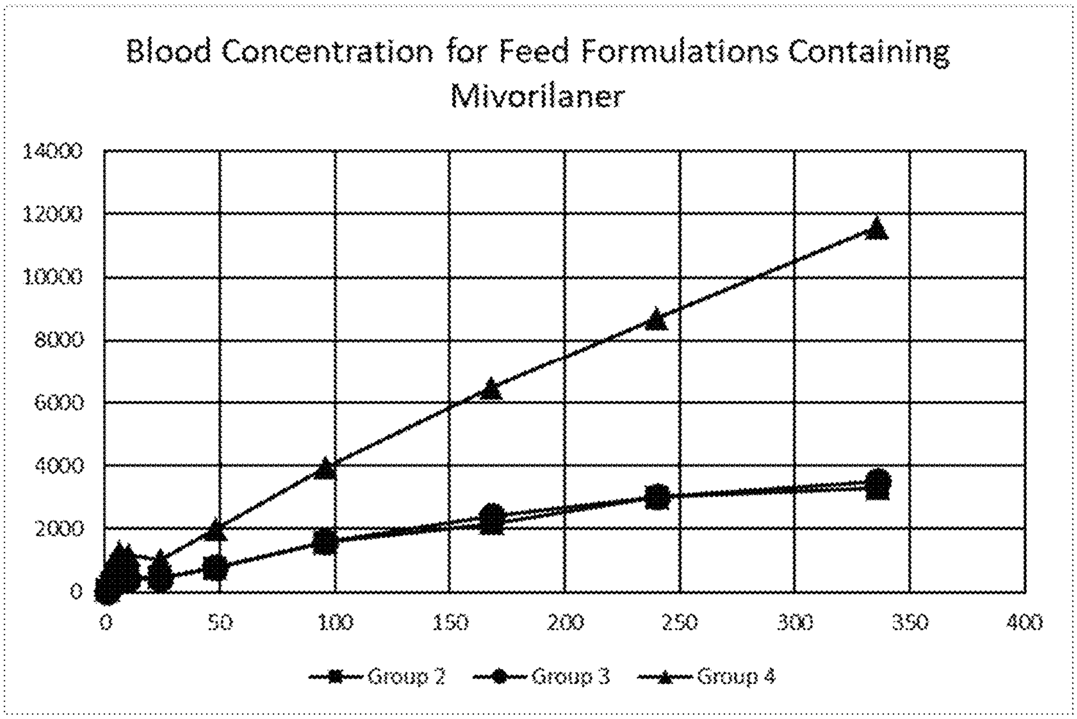

FIG. 9. Graph of blood levels of mivorilaner in canines fed a feed including different levels of the isoxazoline: 106 mg of isoxazoline/kg of feed (Group 2-square symbol); 106 mg of isoxazoline/kg of feed (Group 3-circle symbol); and 318 mg of isoxazoline/kg of feed (Group 4-triangle symbol).

Figure 10:
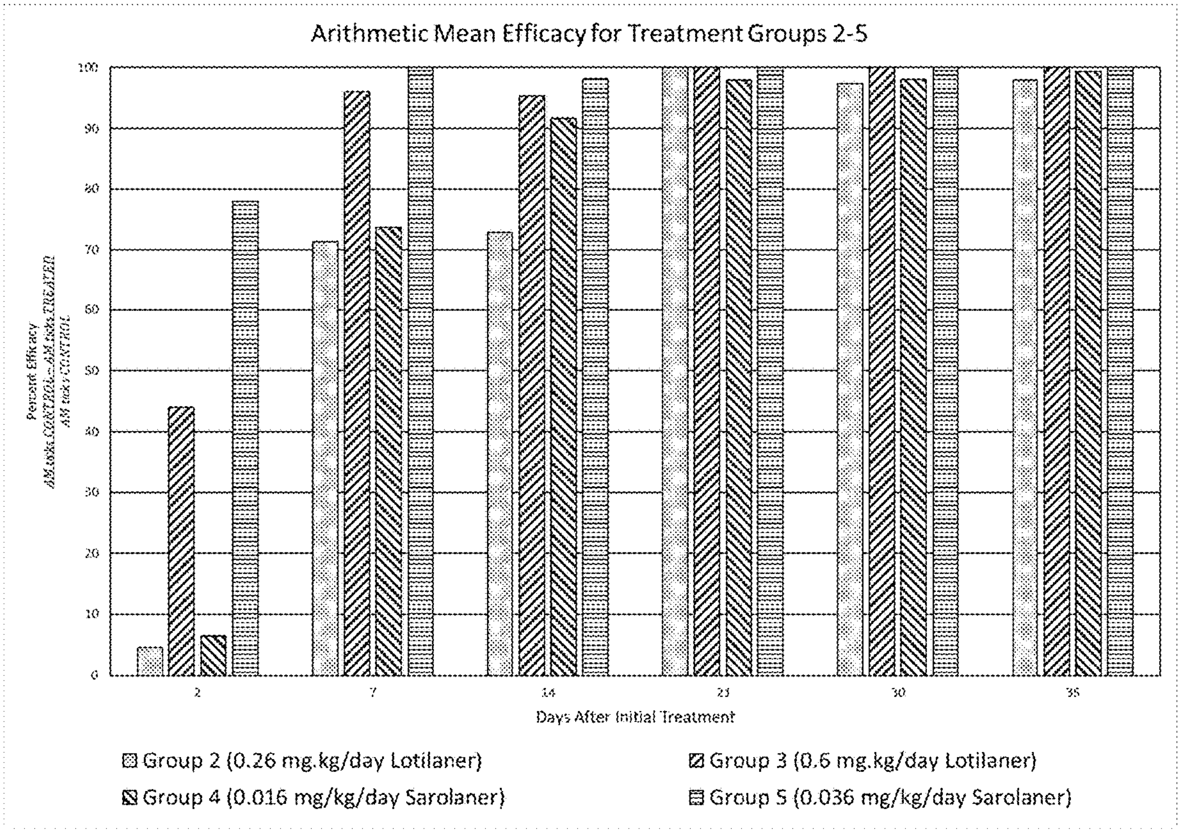

FIG. 10. A graph of the Arithmetic Mean Efficacy. Percent Efficacy=[AM ticks CONTROL−AM ticks TREATED]/AM ticks Control Efficacy is plotted versus time in days. Data collected from canines treated with: 0.26 mg of Lotilaner/kg of animal body mass/day (Group 2, stars); 0.6 mg of Lotilaner/kg of animal body mass/day (Group 3, right hash); 0.016 mg of Sarolaner/kg of animal body mass/day (Group 4, left hash); and 0.036 mg of Sarolaner/kg of animal body mass/day (Group 5, horizontal hash). Comb counts conducted 2, 7, 14, 21, 30, and 35 days after initial treatment with either lotilaner or sarolaner.

DESCRIPTION

All ratios, percentages, and parts discussed herein are "by weight" unless otherwise specified.

The term "controlling a tick infestation" refers to preventing, minimizing or eliminating an infestation by ticks on a canine.

The term "tick" refers to any member of the order Ixodida. The term "tick" includes the egg, larval, nymph, and adult stages of development. More particularly, the term tick includes ticks of the families Ixodidae and Argasidae. More particularly, the term "tick" includes species of the genera *Africaniella, Amblyomma, Anomalohimalaya, Bothriocroton, Dermacentor, Haemaphysalis, Hyalomma, Ixodes, Margaropus, Nosomma, Rhipicentor, Rhipicephalus, Antricola, Argas, Nothoaspis, Ornithodoros*, and *Otobius*.

The term "canine" refers to any member of the genus *Canis*, which includes such species as wolves, dogs, coyotes and jackals.

In carrying out the methods of this disclosure, a "feed" is an animal feed, snack, treat or other supplemental feed that may be administered daily or substantially daily. By using different forms of feed, e.g., kibble and treats, a pet owner may vary the canine's meals and snacks from time to time while still conveniently administering a daily dose of isoxazoline.

The term "chew" refers to a treat that has flavor and aromatic properties that are appealing to a canine, but typically has no nutritional value. In carrying out the methods of this disclosure, a "feed" and/or a "chew" may be used interchangeably.

The term "effective time," also referred to herein as "effective duration," for the purposes of this disclosure includes at least the duration of administration needed to bring the level of isoxazoline in the canine's blood to a sufficiently high level for controlling ticks, i.e., a "therapeutically effective" level. In some embodiments, the effective time may be as little as three days. In other instances, the effective time may be seven days or fifteen days or longer. As discussed below, the effective time will vary based on how frequently the feed or isoxazoline is administered.

As just alluded, the "effective time" will vary as a function of the frequency at which the isoxazoline is administered. The term "effective frequency" as used herein means the number of doses over a given time that produce a therapeutically effective concentration of isoxazoline in the canine's blood. In all events, the term "effective frequency" as used herein contemplates multiple doses of the isoxazoline per month. One of skill in the art will appreciate that the isoxazoline may be administered in a range of frequencies. For example, the isoxazoline may be administered at a frequency of daily, every other day, every third day, once per week or even at inconsistent time intervals.

Further, as discussed above, the effective frequency may affect the duration required to obtain a therapeutically effective level of isoxazoline in the canine's blood. By way of example, if the canine were being fed the feed composition daily, the duration of administration required to achieve a therapeutically effective level of isoxazoline in the canine's blood, and thus the "effective time," would be comparatively less than if the canine were being fed the feed composition only once or twice per week.

Further, the effective frequency is influenced by the amount of the daily dose in mg/kg of body weight of the canine. Particularly, at slightly higher daily doses, missed doses have less of an impact on efficacy.

Further, the effective frequency is influenced by the duration of treatment. In the initial stages, e.g., before the amount of isoxazoline in the canine's blood has reached a therapeutically effective level, the animal feed may need to be administered more often than would be necessary after a longer period of use, i.e., once a therapeutically effective level is obtained.

For purposes of this disclosure, "substantially daily" means a sufficiently regular basis such that the isoxazoline concentration in the canine's blood rises to and remains at a therapeutically effective level. For example, the disclosed feed composition can preferably be fed to a canine every day indefinitely. However, as a practical matter, there are many reasons why days may be missed or skipped periodically. For example, the canine may be ill or the owner may run out of the medicated feed composition. The disclosed method is robust enough that the canine will still be protected from ticks to some extent even with occasional interruptions in doses of isoxazoline. In carrying out the method of this disclosure, the term "substantially daily" includes at least 10 days per month, more preferably at least 15 days per month, still more preferably at least 20 days per month. All of these feeding frequencies, whether they be, e.g., three times per week, every other day or daily, fit under the umbrella of substantially daily provided that they promote the isoxazoline reaching and maintaining a therapeutically effective level of the isoxazoline in the canine's blood.

The term "therapeutically effective" means that the dose or blood level of isoxazoline is sufficient to control the tick infestation better than if no drug were present. The isoxazoline may be present on its own or with one or more additional active substances. Preferably it controls the tick infestation at around at least 50% better than if no drug were present, and more preferably it controls the tick infestation at about at least 90% better than if no drug were present.

In carrying out the methods of this disclosure, an effective amount of an isoxazoline is administered orally to the canine. The term "effective amount" or "therapeutically effective amount" refers to the amount needed to control the tick infestation. As those in the art will understand, this amount will vary depending upon a number of factors. These factors include, for example, the type of canine being treated and its weight and general physical condition.

Isooxazolines vary in potency. Thus, the effective amount of isoxazoline must be calculated for each particular isoxazoline used in the method according to this disclosure. In general, the effective amount for an oral daily dose of an isoxazoline will be in the range of about 12.5%-90% of the approved label dose for said isoxazoline divided by length of the dosing/retreatment interval (e.g., the dosage divided by 30 for a product administered once per month). One of skill in the art will recognize that a higher dose of, e.g., 90%-200% of the approved label dose for said isoxazoline may be selected for reasons such as, but not limited to, manufacturability, ease of testing and analysis, etc. The particular dose selected may be sufficient to raise the canine's blood concentration of said isoxazoline to a therapeutically effective level within about 7 days of substantially daily administrations, more preferably within about 5 days of substantially daily administrations, most preferably within about 3 days of substantially daily administrations.

While this disclosure describes concentrations of isoxazoline in terms of daily feeds such as kibble, it also contemplates administration using other dosage forms, such as treats or chews. It is also contemplated that the isoxazoline may be administered by itself or in a tablet, liquid, gel or other suitable form for oral administration. One of skill in the art will appreciate that the concentration of isoxazoline will vary according to the particular dosage form. For example, where the animal feed is a treat, the concentration of isoxazoline in the treat will be greater than, e.g., the concentration of isoxazoline in a kibble. For example, if the daily dose of isoxazoline based on the weight of the canine is then a typical 5 g treat may contain about 0.004 percent isoxazoline (by weight). Since the amount of kibble consumed in a day is more than 5 g, the percent isoxazoline in kibble will be smaller.

For example, an effective amount of mivorilaner may be a dose of from about to about 3.33 mg of mivorilaner/kg of body weight of the canine. More preferably, an effective amount of mivorilaner may be a dose of from about 0.33 to about 1.5 mg of mivorilaner/kg of body weight of the canine. More commonly, the effective amount is from about 0.21 to about 1.25 mg/kg of body weight of the canine.

Animal feeds will typically contain from about 0.001 to about 0.4 percent of mivorilaner (by weight) in the feed; preferably between about 0.002 to about 0.24 percent of mivorilaner (by weight) in the feed; most preferably between about 0.003 to about percent of mivorilaner component or components (by weight) in the feed.

In another example, an effective amount of lotilaner may be a dose of from about 0.083 to about 1.33 mg of lotilaner/kg of body weight of the canine. More preferably, an effective amount of lotilaner may be a dose of from about 0.133 to about mg of lotilaner/kg of body weight of the canine. More commonly, the effective amount is from about 0.083 to about 0.5 mg/kg of body weight of the canine.

Animal feeds will typically contain from about 0.0004 to about 0.16 percent of lotilaner (by weight) in the feed; preferably between about 0.0008 to about 0.1 percent of lotilaner (by weight) in the feed; most preferably between about 0.002 to about 0.005 percent of lotilaner component or components (by weight) in the feed.

In another example, an effective amount of afoxolaner may be a dose of from about 0.01 to about 0.167 mg of afoxolaner/kg of body weight of the canine. More preferably, an effective amount of afoxolaner may be a dose of from about 0.017 to about mg of afoxolaner/kg of body weight of the canine. More commonly, the effective amount is from about 0.01 to about 0.0625 mg/kg of body weight of the canine.

Animal feeds will typically contain from about 0.00005 to about 0.16 percent of afoxolaner (by weight) in the feed; preferably between about 0.0001 to about 0.1 percent of afoxolaner (by weight) in the feed; most preferably between about 0.0003 to about 0.006 percent of afoxolaner component or components (by weight) in the feed.

In another example, an effective amount of esafoxolaner may be a dose of from about 0.005 to about 0.08 mg of esafoxolaner/kg of body weight of the canine. More preferably, an effective amount of esafoxolaner may be a dose of from about 0.008 to about 0.0375 mg of esafoxolaner/kg of body weight of the canine. More commonly, the effective amount is from about 0.005 to about 0.03125 mg/kg of body weight of the canine.

Animal feeds will typically contain from about 0.00002 to about 0.16 percent of esafoxolaner (by weight) in the feed; preferably between about 0.00005 to about 0.1 percent of esafoxolaner (by weight) in the feed; most preferably between about 0.0001 to about 0.003 percent of esafoxolaner component or components (by weight) in the feed.

In another example, an effective amount of sarolaner may be a dose of from about 0.005 to about 0.08 mg of sarolaner/kg of body weight of the canine. More preferably, an effective amount of sarolaner may be a dose of from about 0.008 to about mg of sarolaner/kg of body weight of the canine. More commonly, the effective amount is from about 0.005 to about 0.03 mg/kg of body weight of the canine.

Animal feeds will typically contain from about 0.00002 to about 0.16 percent of sarolaner (by weight) in the feed; preferably between about 0.00004 to about 0.1 percent of sarolaner (by weight) in the feed; most preferably between about 0.0001 to about 0.003 percent of sarolaner component or components (by weight) in the feed.

In another example, an effective amount of fluralaner may be a dose of from about 0.0417 to about 0.67 mg of fluralaner/kg of body weight of the canine. More preferably, an effective amount of fluralaner may be a dose of from about 0.067 to about mg of fluralaner/kg of body weight of the canine. More commonly, the effective amount is from about 0.0417 to about 0.25 mg/kg of body weight of the canine.

Animal feeds will typically contain from about 0.0002 to about 0.16 percent of fluralaner (by weight) in the feed; preferably between about 0.0004 to about 0.1 percent of fluralaner (by weight) in the feed; most preferably between about 0.001 to about 0.03 percent of fluralaner component or components (by weight) in the feed.

In another example, an effective amount of umifoxolaner may be a dose of from about 0.005 to about 0.08 mg of umifoxolaner/kg of body weight of the canine. More preferably, an effective amount of umifoxolaner may be a dose of from about 0.008 to about 0.0375 mg of umifoxolaner/kg of body weight of the canine. More commonly, the effective amount is from about 0.005 to about 0.03125 mg/kg of body weight of the canine.

Animal feeds will typically contain from about 0.00002 to about 0.16 percent of umifoxolaner (by weight) in the feed; preferably between about 0.00005 to about 0.1 percent of umifoxolaner (by weight) in the feed; most preferably between about 0.0001 to about 0.003 percent of umifoxolaner component or components (by weight) in the feed.

In another example, an effective amount of tigolaner may be a dose of from about 0.005 to about 0.08 mg of tigolaner/kg of body weight of the canine. More preferably, an effective amount of tigolaner may be a dose of from about 0.008 to about mg of tigolaner/kg of body weight of the canine. More commonly, the effective amount is from about 0.005 to about 0.03125 mg/kg of body weight of the canine.

Animal feeds will typically contain from about 0.00002 to about 0.16 percent of tigolaner (by weight) in the feed; preferably between about 0.00005 to about 0.1 percent of tigolaner (by weight) in the feed; most preferably between about 0.0001 to about 0.003 percent of tigolaner component or components (by weight) in the feed.

In one aspect, this disclosure relates to a method of controlling a tick infestation in a canine by administering a systemically active oral composition including isoxazoline and animal feed at least once per week, more preferably three times per week, most preferably substantially daily.

In another aspect, this disclosure relates to a systemically active oral composition that includes an isoxazoline and animal feed.

This disclosure also relates to the use of an isoxazoline for the manufacture of an animal feed or a chew for controlling a tick infestation on a canine.

This disclosure also relates to a method of controlling a tick infestation on a canine for a prolonged time, comprising orally administering daily or substantially daily doses of an effective amount of an isoxazoline to the canine. This method is especially useful for controlling ticks on a canine for a prolonged time comprising orally administering substantially daily doses of an effective amount of an isoxazoline to the canine.

An aspect of this disclosure is the oral administration of an amount of isoxazoline which is, in and of itself, ineffective or sub-optimal for controlling a tick infestation in a canine when administered in a single dose once per month, but over time with repeated consecutive administrations, as described herein, results in efficacious control of tick infestations. Ineffective or sub-optimal means that a single dosing, as well as several dosings, results in less than a 50% reduction in the tick infestation, including no, or substantially no, reduction, as compared to no drug administration at all. This reflects the chronic, rather than acute, administration aspect disclosed herein.

Embodiment 1: A method of controlling a tick infestation in a canine in need thereof, comprising orally administering to said canine an effective amount of an isoxazoline for an effective time at a frequency of at least four times per month.

Embodiment 2: The method of embodiment 1, wherein said canine is a dog.

Embodiment 3: The method of any of embodiment 1 or 2, wherein said isoxazoline is mivorilaner, or a salt thereof.

Embodiment 4: The method of embodiment 3, wherein said mivorilaner is provided in a feed in an amount selected from the group consisting of between about to about 0.4 percent by weight of the feed and between about 0.002 to about 0.24 percent by weight of the feed.

Embodiment 5: The method of any of embodiments 3-4, wherein said mivorilaner is administered to said canine in an amount selected from the group consisting of between about 0.21 mg/kg and about 3.33 mg/kg of body weight of said canine and between about 0.33 mg/kg and about 1.5 mg/kg of body weight of said canine.

Embodiment 6: The method of any of embodiments 3-5, wherein said administration provides a concentration of mivorilaner of more than about 400 ng/mL and less than about 12,000 ng/mL in said canine's blood for a period of time selected from the group consisting of at least 30 days and at least 365 days.

Embodiment 7: The method of any of embodiment 1 or 2, wherein said isoxazoline is fluralaner, or a salt thereof.

Embodiment 8: The method of embodiment 7, wherein said fluralaner is provided in a feed in an amount selected from the group consisting of between about to about 0.16 percent by weight of the feed and between about 0.0004 to about percent by weight of the feed.

Embodiment 9: The method of any of embodiments 7-8, wherein said fluralaner is administered to said canine in an amount selected from the group consisting of between about 0.0417 mg/kg and about 0.67 mg/kg of body weight of said canine and between about 0.067 mg/kg and about 0.3 mg/kg of body weight of said canine.

Embodiment 10: The method of any of embodiments 7-9, wherein said administration provides a concentration of fluralaner of more than about 40 ng/mL and less than about 3000 ng/mL in said canine's blood for a period of time selected from the group consisting of at least 30 days and at least 365 days.

Embodiment 11: The method of any of embodiment 1 or 2, wherein said isoxazoline is sarolaner, or a salt thereof.

Embodiment 12: The method of embodiment 11, wherein said sarolaner is provided in a feed in an amount selected from the group consisting of between about to about 0.16 percent by weight of the feed and between about 0.00004 to about percent by weight of the feed.

Embodiment 13: The method of any of embodiments 11-12, wherein said sarolaner is administered to said canine in an amount selected from the group consisting of between about 0.005 mg/kg and about 0.08 mg/kg of body weight of said canine and between about 0.008 mg/kg and about 0.036 mg/kg of body weight of said canine.

Embodiment 14: The method of any of embodiments 11-13, wherein said administration provides a concentration of sarolaner of more than about 10 ng/mL and less than about 800 ng/mL in said canine's blood for a period of time selected from the group consisting of at least 30 days and at least 365 days.

Embodiment 15: The method of any of embodiment 1 or 2, wherein said isoxazoline is afoxolaner, or a salt thereof.

Embodiment 16: The method of embodiment 15, wherein said afoxolaner is provided in a feed in an amount selected from the group consisting of between about to about 0.16 percent by weight of the feed and between about 0.0001 to about percent by weight of the feed.

Embodiment 17: The method of any of embodiments 15-16, wherein said afoxolaner is administered to said canine in an amount selected from the group consisting of between about 0.01 mg/kg and about 0.167 mg/kg of body weight of said canine and between about 0.017 mg/kg and about 0.075 mg/kg of body weight of said canine.

Embodiment 18: The method of any of embodiments 15-17, wherein said administration provides a concentration of afoxolaner of more than about 20 ng/mL and less than about 1200 ng/mL in said canine's blood for a period of time selected from the group consisting of at least 30 days and at least 365 days.

Embodiment 19: The method of any of embodiment 1 or 2, wherein said isoxazoline is lotilaner, or a salt thereof.

Embodiment 20: The method of embodiment 19, wherein said lotilaner is provided in a feed in an amount selected from the group consisting of between about 0.0004 to about 0.16 percent by weight of the feed and between about 0.0008 to about 0.1 percent by weight of the feed.

Embodiment 21: The method of any of embodiments 19-20, wherein said lotilaner is administered to said canine in an amount selected from the group consisting of between about 0.083 mg/kg and about 1.33 mg/kg of body weight of said canine and between about 0.133 mg/kg and about 0.6 mg/kg of body weight of said canine.

Embodiment 22: The method of any of embodiments 19-21, wherein said administration provides a concentration of lotilaner of more than about 80 ng/mL and less than about 3000 ng/mL in said canine's blood for a period of time selected from the group consisting of at least 30 days and at least 365 days.

Embodiment 23: The method of any of embodiments 1-22, wherein said isoxazoline is administered as a component of a feed.

Embodiment 24: The method of embodiment 23, wherein said feed is dry dog food.

Embodiment 25: The method of embodiment 23, wherein said feed is wet dog food.

Embodiment 26: The method of any of embodiments 1-22, wherein said isoxazoline is administered as a component of a chew.

Embodiment 27: The method of any of embodiments 1-26, wherein said frequency is selected from the group consisting of at least 3 times per week, substantially daily and daily.

Embodiment 28: The method of any of embodiments 1-27, wherein said effective time comprises administering the isoxazoline for a time period selected from the group consisting of at least one week and at least two weeks.

Embodiment 29: The method of any of embodiments 1-28, wherein said administration provides a therapeutically effective level of isoxazoline in said canine's blood within a time period selected from the group consisting of one week of the first administration of said isoxazoline and two days of the first administration of said isoxazoline.

Embodiment 30: The method of any of embodiments 1-29, wherein said administration provides a therapeutically effective level of isoxazoline in said canine's blood for a time period selected from the group consisting of at least 30 days, at least 60 days, at least 90 days, at least 180 days and at least 365 days.

Embodiment 31: The method of any of embodiments 1-30, wherein said isoxazoline is administered for a period of time selected from the group consisting of at least 15 out of 30 days and at least 20 out of 30 days.

Embodiment 32: The method of any of embodiments 1-31, wherein said isoxazoline is administered as a component of a feed that comprises one or more other active substances.

Embodiment 33: The method of any of embodiments 1-32, further comprising discontinuing the administration of the isoxazoline for a period of time selected from the group consisting of at least 3 days and at least 7 days, wherein the canine's blood concentration of isoxazoline is maintained at a therapeutically effective level.

Embodiment 34: The method of embodiment 33, further comprising resuming the administration of the isoxazoline after the discontinuing of the administration of the isoxazoline and thereby maintaining the canine's blood concentration of isoxazoline at the therapeutically effective level.

Embodiment 35: An isoxazoline for use in controlling ticks on a canine in need thereof, said isoxazoline being administered in an effective amount to said canine for an effective time at a frequency of at least four times per month.

Embodiment 36: The isoxazoline of embodiment 35, wherein said canine is a dog.

Embodiment 37: The isoxazoline of any of embodiment 35 or 36, wherein said isoxazoline is mivorilaner, or a salt thereof.

Embodiment 38: The isoxazoline of embodiment 37, wherein said mivorilaner is provided in a feed in an amount selected from the group consisting of between about 0.001 to about 0.4 percent by weight of the feed and about 0.002 to about 0.24 percent by weight of the feed.

Embodiment 39: The isoxazoline of any of embodiments 37-38, wherein said mivorilaner is administered to said canine in an amount selected from the group consisting of between about 0.21 mg/kg and about 3.33 mg/kg of body weight of said canine and between about 0.33 mg/kg and about 1.5 mg/kg of body weight of said canine.

Embodiment 40: The isoxazoline of any of embodiments 37-39, wherein said administration provides a concentration of mivorilaner of more than about 400 ng/mL and less than about 12,000 ng/mL in said canine's blood for a period of time selected from the group consisting of at least 30 days and at least 365 days.

Embodiment 41: The isoxazoline of any of embodiment 35 or 36, wherein said isoxazoline is fluralaner, or a salt thereof.

Embodiment 42: The isoxazoline of embodiment 41, wherein said fluralaner is provided in a feed in an amount selected from the group consisting of between about to about 0.16 percent by weight of the feed and between about 0.0004 to about percent by weight of the feed.

Embodiment 43: The isoxazoline of any of embodiments 41-42, wherein said fluralaner is administered to said canine in an amount selected from the group consisting of between about 0.0417 mg/kg and about 0.67 mg/kg of body weight of said canine and between about 0.067 mg/kg and about 0.3 mg/kg of body weight of said canine.

Embodiment 44: The isoxazoline of any of embodiments 41-43, wherein said administration provides a concentration of fluralaner of more than about 40 ng/mL and less than about 3000 ng/mL in said canine's blood for a period of time selected from the group consisting of at least 30 days and at least 365 days.

Embodiment 45: The isoxazoline of any of embodiment 35 or 36, wherein said isoxazoline is sarolaner, or a salt thereof.

Embodiment 46: The isoxazoline of embodiment 45, wherein said sarolaner is provided in a feed in an amount selected from the group consisting of between about to about 0.16 percent by weight of the feed and between about 0.00004 to about percent by weight of the feed.

Embodiment 47: The isoxazoline of any of embodiments 45-46, wherein said sarolaner is administered to said canine in an amount selected from the group consisting of between about 0.005 mg/kg and about 0.08 mg/kg of body weight of said canine and between about 0.008 mg/kg and about 0.036 mg/kg of body weight of said canine.

Embodiment 48: The isoxazoline of any of embodiments 45-47, wherein said administration provides a concentration of sarolaner of more than about 10 ng/mL and less than about 800 ng/mL in said canine's blood for a period of time selected from the group consisting of at least 30 days and at least 365 days.

Embodiment 49: The isoxazoline of any of embodiment 35 or 36, wherein said isoxazoline is afoxolaner, or a salt thereof.

Embodiment 50: The isoxazoline of embodiment 49, wherein said afoxolaner is provided in a feed in an amount selected from the group consisting of between about to about 0.16 percent by weight of the feed and between about 0.0001 to about percent by weight of the feed.

Embodiment 51: The isoxazoline of any of embodiments 49-50, wherein said afoxolaner is administered to said canine in an amount selected from the group consisting of between about 0.01 mg/kg and about 0.167 mg/kg of body weight of said canine and between about 0.017 mg/kg and about 0.075 mg/kg of body weight of said canine.

Embodiment 52: The isoxazoline of any of embodiments 49-51, wherein said administration provides a concentration of afoxolaner of more than about 20 ng/mL and less than about 1200 ng/mL in said canine's blood for a period of time selected from the group consisting of at least 30 days and at least 365 days.

Embodiment 53: The isoxazoline of any of embodiment 35 or 36, wherein said isoxazoline is lotilaner, or a salt thereof.

Embodiment 54: The isoxazoline of embodiment 53, wherein said lotilaner is provided in a feed in an amount selected from the group consisting of between about to about 0.16 percent by weight of the feed and between about 0.0008 to about percent by weight of the feed.

Embodiment 55: The isoxazoline of any of embodiments 53-54, wherein said lotilaner is administered to said canine in an amount selected from the group consisting of between about 0.083 mg/kg and about 1.33 mg/kg of body weight of said canine and between about 0.133 mg/kg and about 0.6 mg/kg of body weight of said canine.

Embodiment 56: The isoxazoline of any of embodiments 53-55, wherein said administration provides a concentration of lotilaner of more than about 80 ng/mL and less than about 3000 ng/mL in said canine's blood for a period of time selected from the group consisting of at least 30 days and at least 365 days.

Embodiment 57: The isoxazoline of any of embodiments 35-56, wherein said isoxazoline is administered as a component of a feed.

Embodiment 58: The isoxazoline of embodiment 57, wherein said feed is dry dog food.

Embodiment 59: The isoxazoline of any of embodiment 57, wherein said feed is wet dog food.

Embodiment 60: The isoxazoline of any of embodiments 35-56, wherein said isoxazoline is administered as a component of a chew.

Embodiment 61: The isoxazoline of any of embodiments 35-60, wherein said feeding frequency is selected from the group consisting of at least 3 times per week, substantially daily and daily.

Embodiment 62: The isoxazoline of any of embodiments 35-61, wherein said effective time comprises administering the isoxazoline for a period of time selected from the group consisting of at least one week and at least two weeks.

Embodiment 63: The isoxazoline of any of embodiments 35-62, wherein said administration provides a therapeutically effective level of isoxazoline in said canine's blood within a period of time selected from the group consisting of one week of the first administration of said isoxazoline and two days of the first administration of said isoxazoline.

Embodiment 64: The isoxazoline of any of embodiments 35-63, wherein said administration provides a therapeutically effective level of isoxazoline in said canine's blood for a period of time selected from the group consisting of at least 30 days, at least days, at least 90 days, at least 180 days and at least 365 days.

Embodiment 65: The isoxazoline of any of embodiments 35-64, wherein said isoxazoline is administered at a frequency selected from the group consisting of at least out of 30 days and at least 20 out of 30 days.

Embodiment 66: The isoxazoline of any of embodiments 35-65, wherein said isoxazoline is administered as a component of a feed that comprises one or more other active substances.

Embodiment 67: The isoxazoline of any of embodiments 35-66, further comprising discontinuing the administration of the isoxazoline for a period of time selected from the group consisting of at least 3 days and at least 7 days, wherein the canine's blood concentration of isoxazoline is maintained at a therapeutically effective level.

Embodiment 68: The isoxazoline of embodiment 67, further comprising resuming the administration of the isoxazoline after the discontinuing of the administration of the isoxazoline and thereby maintaining the canine's blood concentration of isoxazoline at the therapeutically effective level.

Embodiment 69: A feed or chew for controlling ticks in a canine, said feed or chew comprising an effective amount of an isoxazoline to control a tick infestation when administered to said canine for an effective time at a frequency of at least four times per month.

Embodiment 70: The feed or chew of embodiment 69, wherein said canine is a dog.

Embodiment 71: The feed or chew of any of embodiment 69 or 70, wherein said isoxazoline is mivorilaner, or a salt thereof.

Embodiment 72: The feed or chew of embodiment 71, wherein said mivorilaner is provided in a feed in an amount selected from the group consisting of between about 0.001 to about 0.4 percent by weight of the feed and between about 0.002 to about 0.24 percent by weight of the feed.

Embodiment 73: The feed or chew of any of embodiments 71-72, wherein said mivorilaner is administered to said canine in an amount selected from the group consisting of between about 0.21 mg/kg and about 3.33 mg/kg of body weight of said canine and between about 0.33 mg/kg and about 1.5 mg/kg of body weight of said canine.

Embodiment 74: The feed or chew of any of embodiments 71-73, wherein said administration provides a concentration of mivorilaner of more than about 400 ng/mL and less than about 12,000 ng/mL in said canine's blood for a period of time selected from the group consisting of at least 30 days and at least 365 days.

Embodiment 75: The feed or chew of any of embodiment 69 or 70, wherein said isoxazoline is fluralaner, or a salt thereof.

Embodiment 76: The feed or chew of embodiment 75, wherein said fluralaner is provided in a feed in an amount selected from the group consisting of between about to about 0.16 percent by weight of the feed and between about 0.0004 to about percent by weight of the feed.

Embodiment 77: The feed or chew of any of embodiments 75 or 76, wherein said fluralaner is administered to said canine in an amount selected from the group consisting of between about 0.0417 mg/kg and about 0.67 mg/kg of body weight of said canine and between about 0.067 mg/kg and about 0.3 mg/kg of body weight of said canine.

Embodiment 78: The feed or chew of any of embodiments 75-77, wherein said administration provides a concentration of fluralaner of more than about 40 ng/mL and less than about 3000 ng/mL in said canine's blood for a period of time selected from the group consisting of at least 30 days and at least 365 days.

Embodiment 79: The feed or chew of any of embodiment 69 or 70, wherein said isoxazoline is sarolaner, or a salt thereof.

Embodiment 80: The feed or chew of embodiment 79, wherein said sarolaner is provided in a feed in an amount selected from the group consisting of between about to about 0.16 percent by weight of the feed and between about 0.00004 to about percent by weight of the feed.

Embodiment 81: The feed or chew of any of embodiments 79 or 80, wherein said sarolaner administered to said canine in an amount selected from the group consisting of between about 0.005 mg/kg and about 0.08 mg/kg of body weight of said canine and between about 0.008 mg/kg and about 0.036 mg/kg of body weight of said canine.

Embodiment 82: The feed or chew of any of embodiments 79-81, wherein said administration provides a concentration of sarolaner of more than about 10 ng/mL and less than about 800 ng/mL in said canine's blood for a period of time selected from the group consisting of at least 30 days and at least 365 days.

Embodiment 83: The feed or chew of any of embodiment 69 or 70, wherein said isoxazoline is afoxolaner, or a salt thereof.

Embodiment 84: The feed or chew of embodiment 83, wherein said afoxolaner is provided in a feed in an amount selected from the group consisting of between about 0.00005 to about 0.16 percent by weight of the feed and between about to about 0.1 percent by weight of the feed.

Embodiment 85: The feed or chew of any of embodiments 83 or 84, wherein said afoxolaner is administered to said canine in an amount selected from the group consisting of between about 0.01 mg/kg and about 0.167 mg/kg of body weight of said canine and between about 0.017 mg/kg and about 0.075 mg/kg of body weight of said canine.

Embodiment 86: The feed or chew of any of embodiments 83-85, wherein said administration provides a concentration of afoxolaner of more than about 20 ng/mL and less than about 1200 ng/mL in said canine's blood for a period of time selected from the group consisting of at least 30 days and at least 365 days.

Embodiment 87: The feed or chew of any of embodiment 69 or 70, wherein said isoxazoline is lotilaner, or a salt thereof.

Embodiment 88: The feed or chew of embodiment 87, wherein said lotilaner is provided in a feed in an amount selected from the group consisting of between about to about 0.16 percent by weight of the feed and between about 0.0008 to about percent by weight of the feed.

Embodiment 89: The feed or chew of any of embodiments 87 or 88, wherein said lotilaner is administered to said canine in an amount selected from the group consisting of between about 0.083 mg/kg and about 1.33 mg/kg of body weight of said canine and between about 0.133 mg/kg and about 0.6 mg/kg of body weight of said canine.

Embodiment 90: The feed or chew of any of embodiments 87-89, wherein said administration provides a concentration of lotilaner of more than about 80 ng/mL and less than about 3000 ng/mL in said canine's blood for a period of time selected from the group consisting of at least 30 days and at least 365 days.

Embodiment 91: The feed or chew of any of embodiments 69-90, wherein said feed is dry dog food.

Embodiment 92: The feed or chew of any of embodiments 69-90, wherein said feed is wet dog food.

Embodiment 93: The feed or chew of any of embodiments 69-92, wherein said frequency is selected from the group consisting of at least 3 times per week, substantially daily and daily.

Embodiment 94: The feed or chew of any of embodiments 69-93, wherein said effective time comprises administering the feed or chew for a period of time selected from the group consisting of at least one week and at least two weeks.

Embodiment 95: The feed or chew of any of embodiments 69-94, wherein said administration provides a therapeutically effective level of isoxazoline in said canine's blood within a period of time selected from the group consisting of one week of the first administration of said feed or chew and two days of the first administration of said feed or chew.

Embodiment 96: The feed or chew of any of embodiments 69-95, wherein said administration provides a therapeutically effective level of isoxazoline in said canine's blood for a period of time selected from the group consisting of at least 30 days, at least 60 days, at least 90 days, at least 180 days and at least 365 days.

Embodiment 97: The feed or chew of any of embodiments 69-96, wherein said feed or chew is administered at a frequency selected from the group consisting of at least 15 out of 30 days and at least 20 out of 30 days.

Embodiment 98: The feed or chew of any of embodiments 69-97, wherein said feed or chew comprises one or more other active substances.

Embodiment 99: The feed or chew of any of embodiments 69-98, further comprising discontinuing the administration of the feed or chew for a period of time selected from the group consisting of at least 3 days and at least 7 days, wherein the canine's blood concentration of isoxazoline is maintained at a therapeutically effective level.

Embodiment 100: The feed or chew of embodiment 99, further comprising resuming the administration of the feed or chew after the discontinuing of the administration of the feed or chew and thereby maintaining the canine's blood concentration of isoxazoline at the therapeutically effective level.

Embodiment 101: The method of any of embodiment 1 or 2, wherein said isoxazoline is umifoxolaner, or a salt thereof.

Embodiment 102: The method of embodiment 101, wherein said umifoxolaner is provided in a feed in an amount selected from the group consisting of between about 0.00002 to about 0.16 percent by weight of the feed and between about to about 0.1 percent by weight of the feed.

Embodiment 103: The method of any of embodiments 101-102, wherein said umifoxolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 104: The method of any of embodiments 101-103, wherein said administration provides a concentration of umifoxolaner of more than about 10 ng/mL and less than about 800 ng/mL in said canine's blood for a period of time selected from the group consisting of at least 30 days and at least 365 days.

Embodiment 105: The method of any of embodiment 1 or 2, wherein said isoxazoline is esafoxolaner, or a salt thereof.

Embodiment 106: The method of embodiment 105, wherein said esafoxolaner is provided in a feed in an amount selected from the group consisting of between about to about 0.16 percent by weight of the feed and between about 0.00005 to about percent by weight of the feed.

Embodiment 107: The method of any of embodiments 105-106, wherein said esafoxolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 108: The method of any of embodiments 105-107, wherein said administration provides a concentration of esafoxolaner of more than about 10 ng/mL and less than about 600 ng/mL in said canine's blood for a period of time selected from the group consisting of at least 30 days and at least 365 days.

Embodiment 109: The method of any of embodiment 1 or 2, wherein said isoxazoline is tigolaner, or a salt thereof.

Embodiment 110: The method of embodiment 109, wherein said tigolaner is provided in a feed in an amount selected from the group consisting of between about to about 0.16 percent by weight of the feed and between about 0.00005 to about percent by weight of the feed.

Embodiment 111: The method of any of embodiments 109-110, wherein said tigolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 112: The method of any of embodiments 109-111, wherein said administration provides a concentration of tigolaner of more than about 10 ng/mL and less than about 600 ng/mL in said canine's blood for a period of time selected from the group consisting of at least 30 days and at least 365 days.

Embodiment 113: The isoxazoline of any of embodiment 35 or 36, wherein said isoxazoline is umifoxolaner, or a salt thereof.

Embodiment 114: The isoxazoline of embodiment 113, wherein said umifoxolaner is provided in a feed in an amount selected from the group consisting of between about 0.00002 to about 0.16 percent by weight of the feed and between about to about 0.1 percent by weight of the feed.

Embodiment 115: The isoxazoline of any of embodiments 113-114, wherein said umifoxolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 116: The isoxazoline of any of embodiments 113-115, wherein said administration provides a concentration of umifoxolaner of more than about 10 ng/mL and less than about 800 ng/mL in said canine's blood for a period of time selected from the group consisting of at least 30 days and at least 365 days.

Embodiment 117: The isoxazoline of any of embodiment 35 or 36, wherein said isoxazoline is esafoxolaner, or a salt thereof.

Embodiment 118: The isoxazoline of embodiment 117, wherein said esafoxolaner is provided in a feed in an amount selected from the group consisting of between about 0.00002 to about 0.16 percent by weight of the feed and between about to about 0.1 percent by weight of the feed.

Embodiment 119: The isoxazoline of any of embodiments 117-118, wherein said esafoxolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 120: The isoxazoline of any of embodiments 118-119, wherein said administration provides a concentration of esafoxolaner of more than about 10 ng/mL and less than about 600 ng/mL in said canine's blood for a period of time selected from the group consisting of at least 30 days and at least 365 days.

Embodiment 121: The isoxazoline of any of embodiment 35 or 36, wherein said isoxazoline is tigolaner, or a salt thereof.

Embodiment 122: The isoxazoline of embodiment 121, wherein said tigolaner is provided in a feed in an amount selected from the group consisting of between about to about 0.16 percent by weight of the feed and between about 0.00005 to about percent by weight of the feed.

Embodiment 123: The isoxazoline of any of embodiments 121-122, wherein said tigolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 124: The isoxazoline of any of embodiments 121-123, wherein said administration provides a concentration of tigolaner of more than about 10 ng/mL and less than about 600 ng/mL in said canine's blood for a period of time selected from the group consisting of at least 30 days and at least 365 days.

Embodiment 125: The feed or chew of any of embodiment 69 or 70, wherein said isoxazoline is umifoxolaner, or a salt thereof.

Embodiment 126: The feed or chew of embodiment 125, wherein said umifoxolaner is provided in a feed in an amount selected from the group consisting of between about 0.00002 to about 0.16 percent by weight of the feed and between about to about 0.1 percent by weight of the feed.

Embodiment 127: The feed or chew of any of embodiments 125-126, wherein said umifoxolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 128: The feed or chew of any of embodiments 125-127, wherein said administration provides a concentration of umifoxolaner of more than about 10 ng/mL and less than about 800 ng/mL in said canine's blood for a period of time selected from the group consisting of at least 30 days and at least 365 days.

Embodiment 129: The feed or chew of any of embodiment 69 or 70, wherein said isoxazoline is esafoxolaner, or a salt thereof.

Embodiment 130: The feed or chew of embodiment 129, wherein said esafoxolaner is provided in a feed in an amount selected from the group consisting of between about 0.00002 to about 0.16 percent by weight of the feed and between about to about 0.1 percent by weight of the feed.

Embodiment 131: The feed or chew of any of embodiments 129-130, wherein said esafoxolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 132: The feed or chew of any of embodiments 129-131, wherein said administration provides a concentration of esafoxolaner of more than about 10 ng/mL and less than about 600 ng/mL in said canine's blood for a period of time selected from the group consisting of at least 30 days and at least 365 days.

Embodiment 133: The feed or chew of any of embodiment 69 or 70, wherein said isoxazoline is tigolaner, or a salt thereof.

Embodiment 134: The feed or chew of embodiment 133, wherein said tigolaner is provided in a feed in an amount selected from the group consisting of between about 0.00002 to about 0.16 percent by weight of the feed and between about 0.00005 to about 0.1 percent by weight of the feed.

Embodiment 135: The feed or chew of any of embodiments 133-134, wherein said tigolaner is administered to said canine in an amount selected from the group consisting of between about 0.005 mg/kg and about 0.08 mg/kg of body weight of said canine and between about 0.008 mg/kg and about 0.0375 mg/kg of body weight of said canine.

Embodiment 136: The feed or chew of any of embodiments 133-135, wherein said administration provides a concentration of tigolaner of more than about 10 ng/mL and less than about 600 ng/mL in said canine's blood for a period of time selected from the group consisting of at least 30 days and at least 365 days.

In an aspect of any of the above embodiments, administration provides a therapeutically effective concentration of the particular isoxazoline in said canine's blood for at least 30 days. The precise concentration may vary according to the particular isoxazoline. For example, administration of mivorilaner provides a concentration of isoxazoline of more than about 400 ng/mL and less than about 12,000 ng/mL in said canine's blood for at least 30 days. More preferably, administration of mivorilaner provides a concentration of isoxazoline of more than about 400 ng/mL and less than about 4,000 ng/mL in said canine's blood for at least 30 days. In another example, afoxolaner provides a concentration of isoxazoline of more than about 20 ng/mL and less than about 1200 ng/mL in said canine's blood for at least 30 days. More preferably, afoxolaner provides a concentration of isoxazoline of more than about 20 ng/mL and less than about 800 ng/mL in said canine's blood for at least 30 days. In another example, fluralaner provides a concentration of isoxazoline of more than about 40 ng/mL and less than about 3000 ng/mL in said canine's blood for at least 30 days. More preferably, fluralaner provides a concentration of isoxazoline of more than about 40 ng/mL and less than about 2000 ng/mL in said canine's blood for at least 30 days. In another example, sarolaner provides a concentration of isoxazoline of more than about 10 ng/mL and less than about 800 ng/mL in said canine's blood for at least 30 days. More preferably, sarolaner provides a concentration of isoxazoline of more than about 10 ng/mL and less than about 600 ng/mL in said canine's blood for at least 30 days. In another example, lotilaner provides a concentration of isoxazoline of more than about 80 ng/mL and less than about 3000 ng/mL in said canine's blood for at least 30 days. More preferably, lotilaner provides a concentration of isoxazoline of more than about 80 ng/mL and less than about 2000 ng/mL in said canine's blood for at least 30 days. In another example, tigolaner provides a concentration of isoxazoline of more than about 10 ng/mL and less than about 800 ng/mL in said canine's blood for at least 30 days. More preferably, tigolaner provides a concentration of isoxazoline of more than about 10 ng/mL and less than about 600 ng/mL in said canine's blood for at least 30 days. In another example, umifoxolaner provides a concentration of isoxazoline of more than about 10 ng/mL and less than about 800 ng/mL in said canine's blood for at least 30 days. More preferably, umifoxolaner provides a concentration of isoxazoline of more than about 10 ng/mL and less than about 600 ng/mL in said canine's blood for at least 30 days. In another example, esafoxolaner provides a concentration of isoxazoline of more than about 10 ng/mL and less than about 600 ng/mL in said canine's blood for at least 30 days. More preferably, esafoxolaner provides a concentration of isoxazoline of more than about 10 ng/mL and less than about 400 ng/mL in said canine's blood for at least 30 days.

In an aspect of any of the above embodiments, administration provides a therapeutically effective concentration of the particular isoxazoline in said canine's blood for at least 365 days. The precise concentration may vary according to the particular isoxazoline. For example, administration of mivorilaner provides a concentration of isoxazoline of more than about 400 ng/mL and less than about 12,000 ng/mL in said canine's blood for at least 365 days. More preferably, administration of mivorilaner provides a concentration of isoxazoline of more than about 400 ng/mL and less than about 9000 ng/mL in said canine's blood for at least 365 days. In another example, afoxolaner provides a concentration of isoxazoline of more than about 20 ng/mL and less than about 1,200 ng/mL in said canine's blood for at least 365 days. More preferably, afoxolaner provides a concentration of isoxazoline of more than about 20 ng/mL and less than about 800 ng/mL in said canine's blood for at least 365 days. In another example, fluralaner provides a concentration of isoxazoline of more than about 40 ng/mL and less than about 3,000 ng/mL in said canine's blood for at least 365 days. More preferably, fluralaner provides a concentration of isoxazoline of more than about 40 ng/mL and less than about 2000 ng/mL in said canine's blood for at least 365 days. In another example, sarolaner provides a concentration of isoxazoline of more than about 10 ng/mL and less than about 800 ng/mL in said canine's blood for at least 365 days. More preferably, sarolaner provides a concentration of isoxazoline of more than about 10 ng/mL and less than about 600 ng/mL in said canine's blood for at least 365 days. In another example, lotilaner provides a concentration of isoxazoline of more than about 80 ng/mL and less than about 3,000 ng/mL in said canine's blood for at least 365 days. More preferably, lotilaner provides a concentration of isoxazoline of more than about 80 ng/mL and less than about 2,000 ng/mL in said canine's blood for at least 365 days. In another example, tigolaner provides a concentration of isoxazoline of more than about 10 ng/mL and less than about 800 ng/mL in said canine's blood for at least 365 days. More preferably, tigolaner provides a concentration of isoxazoline of more than about 10 ng/mL and less than about 600 ng/mL in said canine's blood for at least 365 days. In another example, umifoxolaner provides a concentration of isoxazoline of more than about 10 ng/mL and less than about 800 ng/mL in said canine's blood for at least 365 days. More preferably, umifoxolaner provides a concentration of isoxazoline of more than about 10 ng/mL and less than about 600 ng/mL in said canine's blood for at least 365 days. In another example, esafoxolaner provides a concentration of isoxazoline of more than about 10 ng/mL and less than about 600 ng/mL in said canine's blood for at least 365 days. More preferably, esafoxolaner provides a concentration of isoxazoline of more than about 10 ng/mL and less than about 400 ng/mL in said canine's blood for at least 365 days. The following examples illustrate the methods of this disclosure:

Example 1

Efficacy of Isoxazoline Administered per os, i.e. by mouth, to Dogs for the Treatment and Control of *Rhipicephalus sanguineus.*

Methods: A pool of 14 dogs are to be preliminarily infested with ~100 unfed adult *C. felis* in order to produce dogs that can suitably sustain a reliable infestation rate, defined as approximately 50% fleas being live at the end of a 48-hour period. The 12 dogs with the highest live flea counts are to be selected for inclusion in the study. The dogs are to be divided into a control group and a treatment group.

The dogs are to be housed individually during the study period and are to be fed a commercial dry dog food ration with ad libitum access to water.

Each dog in the treatment group is to receive by mouth a liquid formulation of isoxazoline. The dosage of 0.75 mg/kg is to be administered to the dogs on each of days 0-29.

Dogs in the control group are not to receive isoxazoline or any other tick control treatment. Each dog in the treatment group is to be offered its daily ration (dry food) and the individual doses of liquid formulation are to be administered after the individual dog has eaten at least 25% of its total daily ration. After receiving the dose of isoxazoline, the dogs are to be allowed to continue eating. This mimics incorporating the isoxazoline in feed. Each dog in the treatment group and the control group is to be experimentally infested with 50 adult ticks on test days 5, 12, 19, 28 and 35. Comb counts for live and moribund attached ticks are to be conducted on days 7, 14, 21, 30 and 37.

Figure 1:
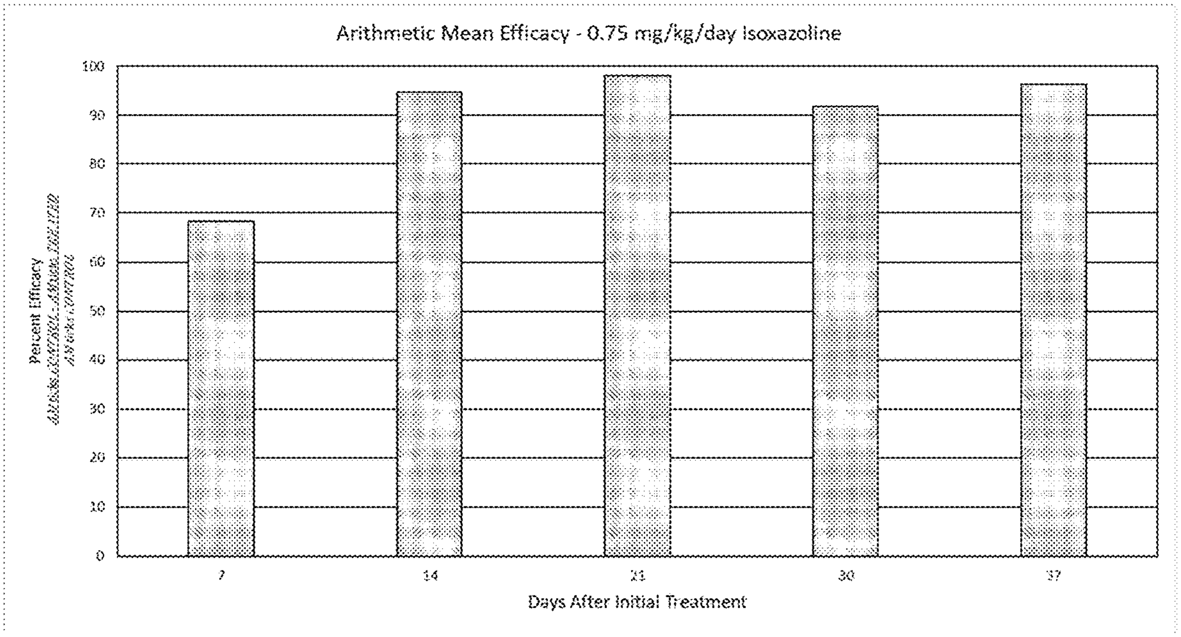
FIG. 1. A graph of the Arithmetic Mean Efficacy. Percent Efficacy=[AM ticks CONTROL−AM ticks TREATED]/AM ticks Control Efficacy is plotted versus time in days. Data collected at 2, 7, 14, 21, 30, 37 and 44 days after the initial dose from canines treated with 0.75 mg of Mivorilaner/kg of animal body mass/day.

Results: Referring now to FIG. 1. Percent reduction in live and moribund attached tick counts for the treatment group are shown in the graph with mivorilaner.

Using the same study method as described above, blood is to be drawn at 72, 168, 336, 504, 720 and 888 hours after the initial dose of isoxazoline is administered. The average concentration of isoxazoline in the blood for different dosage levels can then be determined.

Figure 2:
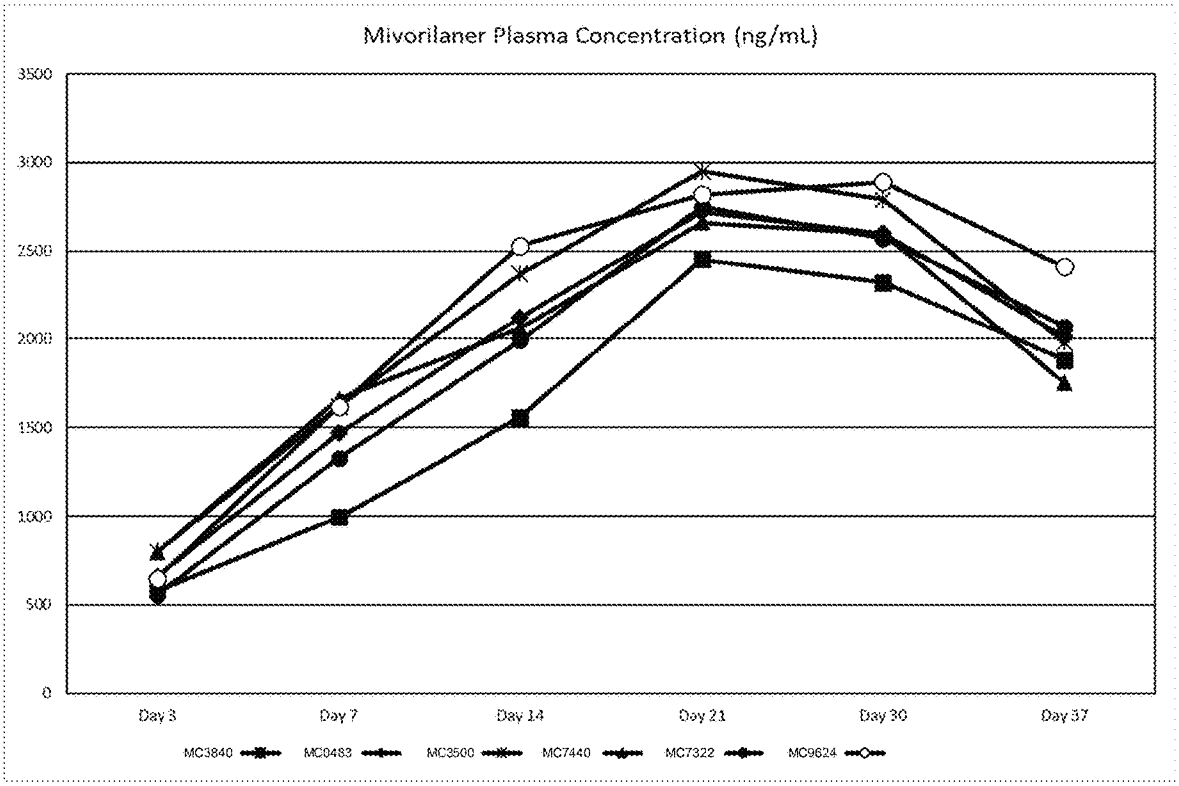
FIG. 2. A graph of mivorilaner levels measured in the plasma of treated animals (ng of mivorilaner/mL of plasma) versus time in days after initial treatment (3, 7, 14, 21, 30, and 37 days). Data collected for test subjects: MC3840 (squares), MC0483 (diamonds), MC3500 (stars), MC7440 (triangles), MC7322 (closed circles), and MC9624 (open circles).

Sample results of the average plasma concentration of mivorilaner in a canine's blood at the different dosage levels are shown TABLE 1 and FIG. 2.

TABLE 1

| Mivorilaner Concentration (ng/mL) | | | | | | | |
|---|---|---|---|---|---|---|---|
| Canine ID | Day −1 | Day 3 | Day 7 | Day 14 | Day 21 | Day 30 | Day 37 |
| MC3840 | BLQ | 579 | 994 | 1560 | 2450 | 2320 | 1880 |
| MC0483 | BLQ | 660 | 1470 | 2120 | 2720 | 2600 | 2010 |
| MC3500 | BLQ | 800 | 1620 | 2370 | 2950 | 2790 | 1980 |
| MC7440 | BLQ | 798 | 1660 | 2060 | 2660 | 2600 | 1750 |
| MC7322 | BLQ | 556 | 1330 | 1990 | 2750 | 2570 | 2070 |
| MC9624 | BLQ | 648 | 1620 | 2530 | 2820 | 2890 | 2410 |
| Average | NA | 674 | 1449 | 2105 | 2725 | 2628 | 2017 |
| Std Dev | NA | 105 | 255 | 336 | 167 | 197 | 223 |
| % CV | NA | 16 | 18 | 16 | 6 | 8 | 11 |

Example 2

Efficacy of Various Doses of Isoxazoline Administered per os, i.e. by mouth, to Dogs for the Treatment and Control of *Rhipicephalus sanguineus.*

Methods: A pool of 46 dogs are to be preliminarily infested with ~50 unfed adult *R. sanguineus* ticks in order to produce dogs that can suitably sustain a reliable infestation rate, defined as approximately 25% of attached ticks being live at the end of a 48-hour period. The 40 dogs with the highest live attached tick counts are to be selected for inclusion in the study. The dogs are to be randomly assigned to one of a control group and 4 treatment groups.

The dogs are to be housed individually during the study period and are to be fed a commercial dry dog food ration with ad libitum access to water.

Each dog in a treatment group (test groups 2-5) is to receive by mouth a liquid formulation of isoxazoline. The dosage is to be administered to the dogs on each of days 0-59 according to test groups listed in TABLE 2.

TABLE 2

| Treatment Group | Daily Dose (mg/kg) | Route | Fed/Fasted State |
|---|---|---|---|
| 1 (control) | 0 mg/kg | n/a | n/a |
| 2 | 0.125 mg/kg daily for 60 consecutive days | Oral | Fed |
| 3 | 0.25 mg/kg daily for 60 consecutive days | Oral | Fed |
| 4 | 0.5 mg/kg daily for 60 consecutive days | Oral | Fed |
| 5 | 1.0 mg/kg daily for 60 consecutive days | Oral | Fed |

Dogs in the control group are not to receive isoxazoline or any other tick control treatment. Each dog in the treatment group is to be offered its daily ration (dry food) and the individual doses of liquid formulation are to be administered after the individual dog has eaten at least 25% of its total daily ration. After receiving the dose of isoxazoline, the dogs are to be allowed to continue eating. Each dog in treatment groups 3-5 and the control group is to be experimentally infested with 50 adult ticks on test days −2, 5, 12, 19, 28, 35 and 42. Dogs in group 2 are to be infested with 50 adult ticks on test days 19, 28 and 35. Comb counts for live adult ticks are to be conducted on days 2, 7, 14, 21, 30, 37 and 44.

Figure 3:
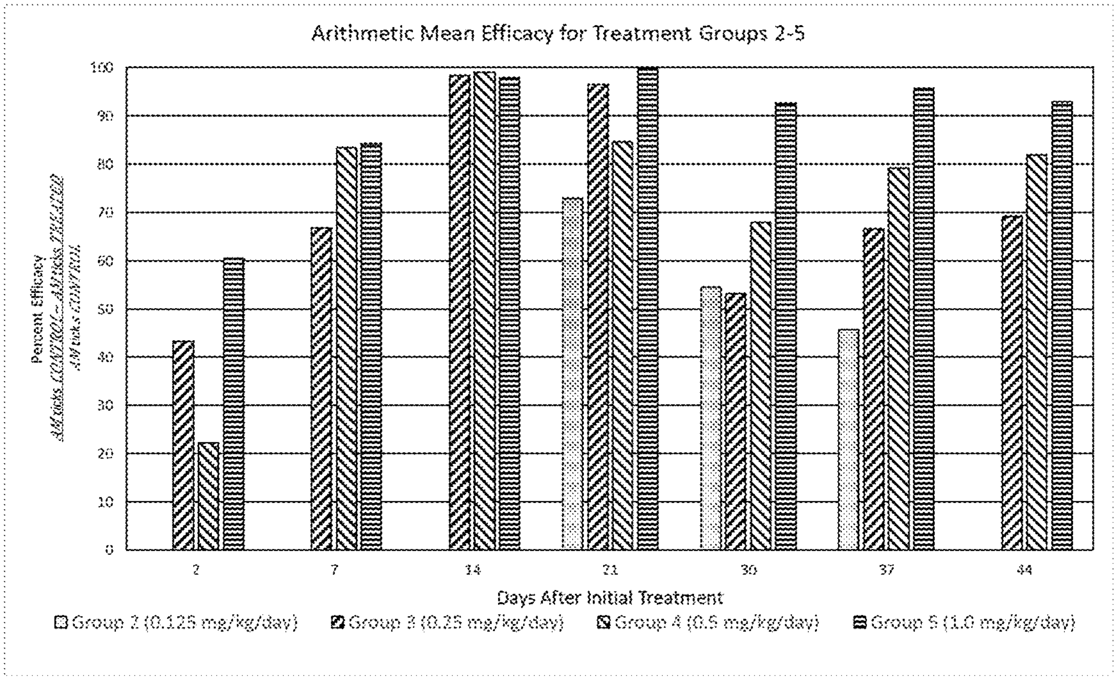
FIG. 3. A graph of the Arithmetic Mean Efficacy. Percent Efficacy=[AM ticks CONTROL−AM ticks TREATED]/AM ticks Control Efficacy is plotted versus time in days. Data collected at 2, 7, 14, 21, 30, 37 and 44 days after the initial dose from: Group 2, 0.125 mg of mivorilaner/kg of animal body mass/day (stippled); Group 3, 0.25 mg of mivorilaner/kg of animal body mass/day (right hash); Group 4, 0.5 mg of mivorilaner/kg of animal body mass/day (left hash); and Group 5, 1.0 mg of mivorilaner/kg of animal body mass/day (horizontal hash).

Results: Referring now to FIG. 3. Percent reduction in live and moribund attached ticks counts for the treatment groups are shown in the graph for different dosage levels of mivorilaner.

Using the same study method as described above, blood is to be drawn at 0, 72, 120, 168, 336, 504, 720, 888, 1056, 1224 and 1440 hours after the initial dose of isoxazoline is administered. The average concentration of isoxazoline in the blood for different dosage levels can then be determined.

Figure 4:
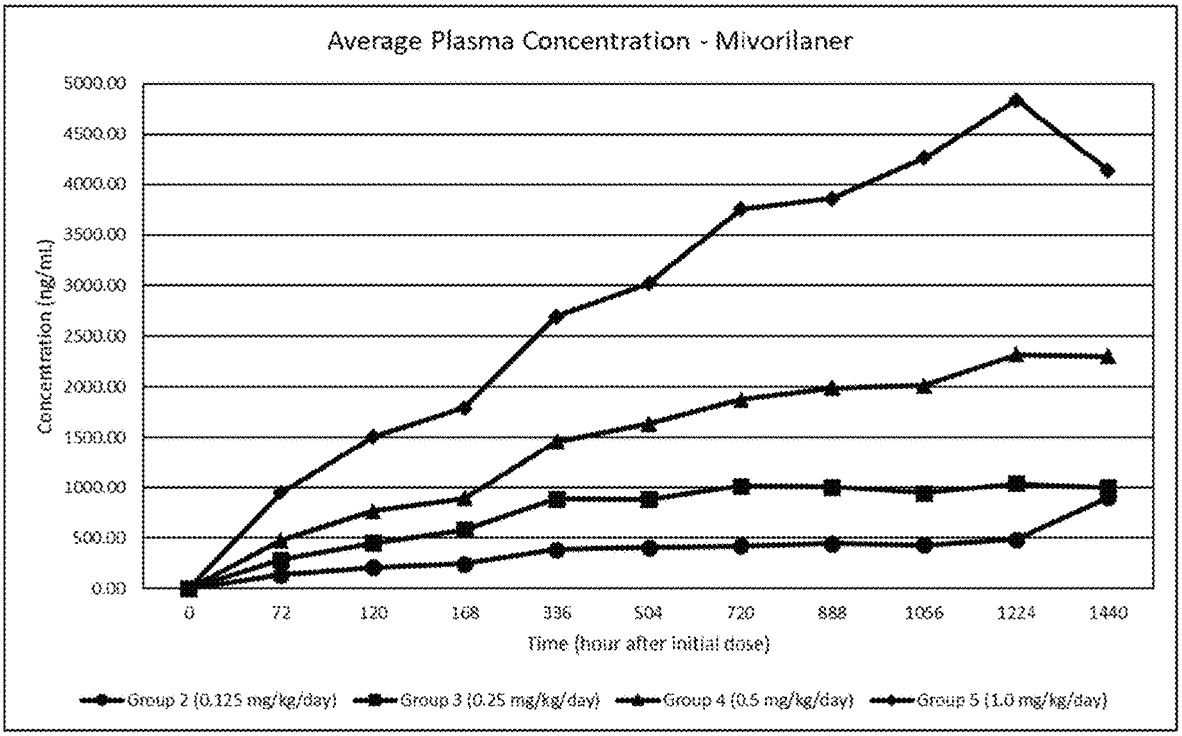
FIG. 4. A graph of mivorilaner levels measured in the plasma of treated animals (ng of mivorilaner/mL of plasma) versus time in hours after initial treatment. Data collected from Groups 2-5 as follows: Group 2, 0.125 mg of mivorilaner/kg of animal body mass/day (circles); Group 3, 0.25 mg of mivorilaner/kg of animal body mass/day (squares)

Sample results of the average plasma concentration of isoxazoline in a canine's blood at different dosage levels of mivorilaner are shown in TABLE 3 and FIG. 4.

TABLE 3

| | Mivorilaner Concentration (ng/ml) | | | |
|---|---|---|---|---|
| Hours after initial dose | Group 2 (0.125 mg/kg/ day) | Group 3 (0.25 mg/kg/ day) | Group 4 (0.5 mg/kg/ day) | Group 5 (1.0 mg/kg/ day) |
| 0 | 0.00 | 0.00 | 0.00 | 0.00 |
| 72 | 135.83 | 283.13 | 474.25 | 951.25 |
| 120 | 212.63 | 450.00 | 763.13 | 1510.00 |
| 168 | 243.63 | 579.13 | 888.00 | 1793.75 |
| 336 | 383.75 | 883.38 | 1457.88 | 2691.25 |
| 504 | 404.13 | 877.75 | 1633.25 | 3016.25 |
| 720 | 419.50 | 1015.63 | 1873.75 | 3756.25 |
| 888 | 447.50 | 1003.88 | 1986.25 | 3861.25 |
| 1056 | 428.38 | 945.13 | 2012.50 | 4263.75 |
| 1224 | 485.50 | 1040.88 | 2318.75 | 4838.75 |
| 1440 | 897.50 | 999.13 | 2298.75 | 4142.50 |

Example 3

Comparison of Plasma Concentration of Isoxazoline in Dogs when Isoxazoline is Administered Intravenously vs. Orally in Solution and Orally in Crystal.

Methods: A pool of 24 dogs, 50% female, 50% male, 6 juveniles, 28 adults, are to be assigned to 4 study groups according to TABLE 4.

TABLE 4

| Group No. | Dose Level (mg/kg) | Dose Route | Dose Concentration (mg/mL) | Age | Number of Canines Male | Number of Canines Female |
|---|---|---|---|---|---|---|
| 1 | 0.25 | Intravenous | 0.5 | Adult | 3 | 3 |
| 2 | 0.25 | Intravenous | 0.5 | Juvenile | 3 | 3 |
| 3 | 1 | Oral Capsule (liquid) | 8 mg/g | Adult | 3 | 3 |
| 4 | 1 | Oral Capsule (crystal) | n/a | Adult | 3 | 3 |

Dogs are to have ad libitum access to water. On Day 1 of the study, juvenile dogs are to be offered ~25% of their daily ration as canned feed prior to receiving the isoxazoline dose. After 4 hours, the juveniles are to be offered the remainder of their daily ration as dry feed. On day 1 of the study, adult dogs are to be provided ~⅓ can of dog food prior to dosing and the remainder of their daily ration after the 10-hour blood collection time point. For the remainder of the study, the daily ration for all dogs should be provided for ~2 hours.

Dogs are to receive 1 dose of isoxazoline in the fed state on Day 1 of the study. Dogs are to be fasted prior to treatment (juveniles are to be fasted <10 hours). Once it is observed that a dog has eaten 25% of its daily ration, it is to receive the isoxazoline treatment within approximately 30 minutes.

Blood samples are to be taken for test groups 1 and 2 (intravenous administration) at 0, 0.083, 0.25, 0.5, 1, 3, 6, 10, 24, 48 and 96 hours after the initial treatment and 7, 10, 14, 21, 28 and 32 days after the initial treatment. Blood samples are to be taken for test groups 3 and 4 (oral administration) at 0, 0.25, 0.5, 1, 3, 6, 10, 24, 48 and 96 hours after the initial treatment and 7, 10, 14, 21, 28 and 32 days after the initial treatment. After the initial samples on day 1, dogs are to be fasted a minimum of 4 hours prior to taking further blood samples.

Results: The mean plasma concentrations in a study performed with mivorilaner approximately according to this example are shown in FIGS. 5*a*, 5*b*, 5*c*, and 5*d*.

Example 4

Efficacy of Various Formulations of Isoxazoline Administered per os, i.e. by mouth, to Dogs for the Treatment and Control of *Rhipicephalus sanguineus.*

Methods: A pool of 36 dogs are to be preliminarily infested with ~50 unfed adult *R. sanguineus* ticks in order to produce dogs that can suitably sustain a reliable infestation rate, defined as approximately 25% of attached ticks being live at the end of a 48-hour period. The 30 dogs with the highest live attached tick counts are to be selected for inclusion in the study. The dogs are to be randomly assigned to one of a control group and 4 treatment groups.

The dogs are to be housed individually during the study period and are to be fed a commercial dry dog food ration with ad libitum access to water.

Each dog in a treatment group (test groups 2-5) is to receive by mouth a liquid formulation of isoxazoline. The dosage is to be administered to the dogs on each of days 0-20 according to test groups listed in TABLE 5.

TABLE 5

| Treatment Group | Treatment Description | Anticipated Oral Dose (mg/kg) | Formulation |
|---|---|---|---|
| 1 | Non-treated control | 0 mg/kg | n/a |
| 2 | Afoxolaner | 0.05 mg/kg daily (Days 0-20) | Afoxolaner liquid formulation |
| 3 | Afoxolaner | 0.15 mg/kg daily (Days 0-20) | Afoxolaner liquid formulation |
| 4 | Fluralaner | 0.083 mg/kg daily (Days 0-20) | Fluralaner liquid formulation |
| 5 | Fluralaner | 0.25 mg/kg daily (Days 0-20) | Fluralaner liquid formulation |

Dogs in the control group are not to receive isoxazoline or any other tick control treatment. Each dog in the treatment group is to be offered its daily ration (dry food) and the individual doses of liquid formulation are to be administered after the individual dog has eaten at least 25% of its total daily ration. After receiving the dose of isoxazoline, the dogs are to be allowed to continue eating. This mimics incorporating the isoxazoline in feed. Each dog in the treatment group and the control group is to be experimentally infested with 50 unfed adult ticks on test days −2, 5, 12, 19 and 28. Comb counts for attached live and moribund adult ticks are to be conducted on days 2, 7, 14, 21 and 30.

Results: Percent reduction in live adult tick counts for treatment groups approximately according to this example are shown in FIG. 6.

Example 5

Plasma Concentration of Isoxazoline in Dogs when Isoxazoline is Administered in a Medicated Feed Dosed at 1.0 mg/kg of the Dog's Weight for One Day.

Results: The mean plasma concentrations in a study performed with mivorilaner approximately according to this example are shown TABLE 6 and FIG. 7.

TABLE 6

| Canine Number | Group Number: | Target Amount (g) | Amount Offered (g) | Amount Remaining (g) | Amount Consumed (g) | Time to finish or bowl removed (min) | Day 1 Bodyweight (g) | Mivorilaner Administered (mg) | Dose Administered (mg/kg) |
|---|---|---|---|---|---|---|---|---|---|
| RN0001 | 1 | 66.2 | 66.0 | 0.0 | 66.0 | 5.0 | 7012.0 | 6.996 | 1.00 |
| RN0002 | | 72.1 | 72.0 | 0.0 | 72.0 | 4.0 | 7644.0 | 7.632 | 1.00 |
| RN0003 | | 71.8 | 72.0 | 25.0 | 47.0 | 15.0 | 7611.0 | 4.982 | 0.65 |
| RN0004 | | 87.7 | 88.0 | 0.0 | 88.0 | 7.0 | 9291.0 | 9.328 | 1.00 |
| RN0005 | | 89.3 | 89.0 | 0.0 | 89.0 | 6.0 | 9464.0 | 9.434 | 1.00 |
| RN0006 | | 88.9 | 89.0 | 17.0 | 72.0 | 15.0 | 9422.0 | 7.632 | 0.81 |
| RN1001 | 2 | 78.0 | 78.0 | 0.0 | 78.0 | 4.0 | 8273.0 | 8.268 | 1.00 |
| RN1002 | | 80.7 | 81.0 | 0.0 | 81.0 | 6.0 | 8552.0 | 8.586 | 1.00 |
| RN1003 | | 78.4 | 78.0 | 0.0 | 78.0 | 5.0 | 8313.0 | 8.268 | 0.99 |
| RN1004 | | 93.7 | 94.0 | 0.0 | 94.0 | 4.0 | 9934.0 | 9.964 | 1.00 |
| RN1005 | | 84.4 | 84.0 | 43.0 | 41.0 | 12.0 | 8951.0 | 4.346 | 0.49 |
| RN1006 | | 87.2 | 87.0 | 0.0 | 87.0 | 4.0 | 9247.0 | 9.222 | 1.00 |
| RN2001 | 3 | 69.6 | 70.0 | 19.0 | 51.0 | 15.0 | 7377.0 | 5.406 | 0.73 |
| RN2002 | | 65.5 | 66.0 | 66.0 | 0.0 | 16.0 | 6943.0 | 0.000 | 0.00 |
| RN2003 | | 79.6 | 80.0 | 75.0 | 5.0 | 15.0 | 8437.0 | 0.530 | 0.06 |
| RN2004 | | 90.3 | 90.0 | 3.0 | 87.0 | 15.0 | 9576.0 | 9.222 | 0.96 |
| RN2005 | | 87.1 | 87.0 | 12.0 | 75.0 | 15.0 | 9230.0 | 7.950 | 0.86 |
| RN2006 | | 98.8 | 99.0 | 71.0 | 28.0 | 15.0 | 10470.0 | 2.968 | 0.28 |
| RN3001 | 4 | 75.8 | 76.0 | 12.0 | 64.0 | 15.0 | 8033.0 | 6.784 | 0.84 |
| RN3002 | | 70.5 | 71.0 | 69.0 | 2.0 | 15.0 | 7472.0 | 0.212 | 0.03 |
| RN3003 | | 80.5 | 81.0 | 32.0 | 49.0 | 15.0 | 8538.0 | 5.194 | 0.61 |
| RN3004 | | 82.5 | 83.0 | 83.0 | 0.0 | 15.0 | 8742.0 | 0.000 | 0.00 |
| RN3005 | | 85.5 | 86.0 | 15.0 | 71.0 | 15.0 | 9067.0 | 7.526 | 0.83 |
| RN3006 | | 85.3 | 85.0 | 42.0 | 43.0 | 15.0 | 9042.0 | 4.558 | 0.50 |
| RN4001 | 5 | 70.7 | 71.0 | 71.0 | 0.0 | 17.0 | 7495.0 | 0.000 | 0.00 |
| RN4002 | | 62.3 | 62.0 | 54.0 | 8.0 | 17.0 | 6600.0 | 0.848 | 0.13 |
| RN4003 | | 66.8 | 67.0 | 0.0 | 67.0 | 6.0 | 7076.0 | 7.102 | 1.00 |
| RN4004 | | 87.8 | 88.0 | 52.0 | 36.0 | 15.0 | 9305.0 | 3.816 | 0.41 |
| RN4005 | | 94.5 | 95.0 | 0.0 | 95.0 | 6.0 | 10020.0 | 10.070 | 1.00 |
| RN4006 | | 96.8 | 97.0 | 0.0 | 97.0 | 5.0 | 10266.0 | 10.282 | 1.00 |

Methods: A pool of 30 dogs are to be assigned to 5 groups by weight to minimize variation between and within the groups. Each group will be given a different feed formulation containing isoxazoline and the blood level of isoxazoline over the one month period following the single dose will be determined.

The dogs are to be housed individually during the study period and are to have ad libitum access to water.

There is to be an initial acclimation period of at least 4 days during which dogs are to be transitioned from a standard certified commercial chow to an unmedicated version of the daily feed. During the acclimation period, the dogs are to be allowed 15 minutes/day to consume the feed.

On the day of the study, dogs are to be presented approximately 9.4 g/kg of daily feed containing isoxazoline. The amount of medicated feed for each dog is to be determined according to the most recent body weight of the dog prior to the day of the study. The medicated feed is to be provided for 15 minutes at the start time of the study. Any uneaten medicated feed is to be removed and weighed. An amount of unmedicated feed equaling the amount of uneaten medicated feed is to be provided ten hours later, at the first blood sampling time.

Blood samples are to be taken at the following times: 0 hr (at the time the medicated feed is provided), 0.25 hr, 0.5 hr, 1 hr, 3 hr, 6 hr, 10 hr, 1 day, 2 days, 4 days, 6 days, 9 days, 13 days, 20 days, 27 days and 31 days after the medicated feed is provided.

It can be appreciated by comparing the examples that an effective amount of isoxazoline on average can be administered to a dog via medicated feed.

Example 6

Efficacy of Isoxazoline when Isoxazoline is Administered in a Medicated Feed for the Treatment and Control of *Rhipicephalus sanguineus*.

Methods: A pool of dogs are to be preliminarily infested with ~50 unfed adult *R. sanguineus* ticks in order to produce dogs that can suitably sustain a reliable infestation rate, defined as approximately 25% of attached ticks being live at the end of a 72-hour period. The 24 dogs with the highest live attached tick counts are to be selected for inclusion in the study. The 18 dogs with the highest live attached tick counts are to be randomly assigned to one of a control group and 2 treatment groups. The 6 dogs with the next highest live attached tick counts are to be assigned to a third treatment group.

The dogs are to be housed individually during the study period and are to have ad libitum access to water.

Each dog in a treatment group (test groups 2-4) is to receive a medicated daily feed from study days 0-49. The medicated daily feed is to be offered to the dogs for 1 hour on each of days 0-49 according to test groups listed in TABLE 7.

TABLE 7

| Treatment Group | # of Dogs | Anticipated Daily Dose (mg/kg) | Infestation with ticks |
|---|---|---|---|
| 1 | 6 | 0 | Yes |
| 2 | 6 | 1 | Yes |
| 3 | 6 | 1 | Yes |
| 4 | 6 | 3 | No |

Dogs in the control group are not to receive isoxazoline or any other tick control treatment. Each dog in treatment groups 2 and 3 and the control group is to be experimentally infested with 50 unfed adult ticks on test days −2, 4, 12 and 28 during the treatment phase and on days 52, 56 and 62 during the wash out period after the final feeding with the medicated daily feed. Comb counts for attached live and moribund adult ticks are to be conducted on days 3, 8, 15, 30, 54 and 58.

Results: Percent reduction in live adult tick counts for treatment groups approximately according to this example are shown in FIG. 8 for mivorilaner.

Using the same study method as described above, blood is to be drawn at 0, 1, 3, 6, 10, 24, 48, 96, 168, 240 and 336 hours after the initial dose of isoxazoline is administered. The average concentration of isoxazoline in the blood for different dosage levels can then be determined.

Sample results of the average plasma concentration of isoxazoline in a canine's blood at different dosage levels are shown in TABLE 8 and FIG. 9 for mivorilaner.

TABLE 8

| Time (hr) | Group 2-106 mg/kg feed | Group 3-106 mg/kg feed | Group 4-318 mg/kg feed |
|---|---|---|---|
| 0 | | | |
| 1 | 49.98 | 40.41 | 143.75 |
| 3 | 292.00 | 264.83 | 846.50 |
| 6 | 539.00 | 467.50 | 1265.67 |
| 10 | 505.40 | 419.17 | 1198.17 |
| 24 | 458.60 | 435.17 | 1021.17 |
| 48 | 771.83 | 781.83 | 2011.67 |
| 96 | 1570.50 | 1596.67 | 3928.33 |
| 168 | 2156.67 | 2406.67 | 6461.67 |
| 240 | 3003.33 | 3026.67 | 8696.67 |
| 336 | 3290.00 | 3516.67 | 11600.00 |

Example 7

Efficacy of Various Formulations of Isoxazoline Administered per os, i.e. by mouth, to Dogs for the Treatment and Control of *Rhipicephalus sanguineus.*

Methods: A pool of 24 dogs are to be preliminarily infested with ~50 unfed adult *R. sanguineus* ticks in order to identify dogs that can suitably sustain a reliable infestation rate, defined as approximately 25% of attached ticks being live at the end of a 48-hour period. The 20 dogs with the highest live attached tick counts are to be selected for inclusion in the study. The dogs are to be randomly assigned to one of a control group and 4 treatment groups.

The dogs are to be housed individually during the study period and are to be fed a commercial dry dog food ration with ad libitum access to water.

Each dog in a treatment group (test groups 2-5) is to receive by mouth a liquid formulation of isoxazoline. The dosage is to be administered to the dogs on each of days according to test groups listed in TABLE 9.

TABLE 9

| Treatment Group | Treatment Description | Anticipated Oral Dose (mg/kg) | Formulation |
|---|---|---|---|
| 1 | Non-treated control | 0 mg/kg | n/a |
| 2 | Lotilaner | 0.26 mg/kg daily (Days 0-27) | Lotilaner liquid formulation |
| 3 | Lotilaner | 0.6 mg/kg daily (Days 0-27) | Lotilaner liquid formulation |
| 4 | Sarolaner | 0.016 mg/kg daily (Days 0-27) | Sarolaner liquid formulation |
| 5 | Sarolaner | 0.036 mg/kg daily (Days 0-27) | Sarolaner liquid formulation |

Dogs in the control group are not to receive isoxazoline or any other tick control treatment. Each dog in the treatment group is to be offered its daily ration (dry food) and the individual doses of liquid formulation are to be administered after the individual dog has eaten at least 25% of its total daily ration. After receiving the dose of isoxazoline, the dogs are to be allowed to continue eating. This mimics incorporating the isoxazoline in feed. Each dog in the treatment group and the control group is to be experimentally infested with 50 unfed adult ticks on test days −2, 5, 12, 19, 28 and 33. Comb counts for live and moribund attached adult ticks are to be conducted on days 2, 7, 14, 21, 30 and 35.

Results: Percent reduction in live and moribund attached adult tick counts for treatment groups approximately according to this example are shown in FIG. 10.

While this invention has been described as having an exemplary design, the present invention may be further modified within the spirit and scope of this disclosure. This application is therefore intended to cover any variations, uses, or adaptations of the invention using its general principles.

What is claimed is:

1. A method of controlling a tick infestation in a canine in need thereof, comprising orally administering a feed to said canine having an effective amount of an isoxazoline and/or tigolaner for a period of time selected from the group consisting of at least one week and at least two weeks at a frequency of substantially daily, wherein the effective amount is a dose that is suboptimal for controlling a tick infestation in a canine when administered as a single dose once per month, but over time at the substantially daily frequency, results in efficacious control of tick infestations.

2. The method of claim 1, further comprising discontinuing the administration of the isoxazoline and/or tigolaner for a period of time selected from the group consisting of at least 3 days and at least 7 days, wherein the canine's blood concentration of isoxazoline is maintained at a therapeutically effective level.

3. The method of claim 2, further comprising resuming the administration of the isoxazoline and/or tigolaner after the discontinuing of the administration of isoxazoline and thereby maintaining the canine's blood concentration of isoxazoline at the therapeutically effective level.

4. The method of claim 1, wherein said administration provides a therapeutically effective level of the isoxazoline and/or tigolaner in said canine's blood within a period of time selected from the group consisting of one week of the first administration of said isoxazoline and/or tigolaner and two days of the first administration of said isoxazoline.

5. The method of claim 1, wherein said administration provides a therapeutically effective level of the isoxazoline and/or tigolaner in said canine's blood for a period of time selected from the group consisting of at least 30 days, at least 60 days, at least 90 days, at least 180 days and at least 365 days.

6. The method of claim 1, wherein said isoxazoline and/or tigolaner is administered for a frequency selected from the group consisting of at least 15 out of 30 days, and at least 20 out of 30 days.

7. The method of claim 1, wherein the isoxazoline and/or tigolaner is at least one compound selected from the group consisting of: mivorilaner, a salt of mivorilaner, afoxolaner, a salt of afoxolaner, sarolaner, a salt of sarolaner, fluralaner, a salt of fluralaner, umifoxolaner, a salt of umifoxolaner, esafoxolaner, a salt of esafoxolaner, tigolaner, a salt of tigolaner, lotilaner, and a salt of lotilaner.

8. A method of controlling a tick infestation in a canine in need thereof, comprising orally administering to said canine an effective amount of mivorilaner for a period of time selected from the group consisting of at least one week and at least two weeks at a frequency of substantially daily, wherein the effective amount is a dose that is suboptimal for controlling a tick infestation in a canine when administered as a single dose once per month, but over time at the substantially daily frequency, results in efficacious control of tick infestations.

9. The method of claim 8, wherein said mivorilaner or salt thereof is provided in a feed in an amount selected from the group consisting of: between about 0.001 to about 0.4 percent by weight of the feed; and between about 0.002 to about 0.24 percent by weight of the feed.

10. The method of claim 8, wherein said mivorilaner or salt thereof is administered to said canine in an amount selected from the group consisting of: between about 0.21 mg/kg and about 3.33 mg/kg of body weight of said canine and between about 0.33 mg/kg;

and about 1.5 mg/kg of body weight of said canine.

11. The method of claim 8, wherein said administration provides a concentration of mivorilaner of more than about 400 ng/ml and less than about 12,000 ng/ml in said canine's blood for a period of time selected from the group consisting of at least 30 days and at least 365 days.

12. A feed or chew for controlling ticks in a canine, comprising an effective amount of an isoxazoline and/or tigolaner when administered to said canine for a period of time selected from the group consisting of at least one week and at least two weeks at a frequency of substantially daily, wherein the effective amount is a dose that is suboptimal for controlling a tick infestation in a canine when administered as a single dose once per month, but over time at the substantially daily frequency, results in efficacious control of tick infestations.

13. The feed or chew of claim 12, wherein the feed is a dry feed or a wet feed.

14. The feed or chew of claim 12, wherein said isoxazoline and/or tigolaner is a component of a feed that comprises one or more other active substances.

15. The feed or chew of claim 12, wherein the isoxazoline and/or tigolaner is at least one compound selected from the group consisting of: mivorilaner, a salt of mivorilaner, afoxolaner, a salt of afoxolaner, sarolaner, a salt of sarolaner, fluralaner, a salt of fluralaner, umifoxolaner, a salt of umifoxolaner, esafoxolaner, a salt of esafoxolaner, tigolaner, a salt of tigolaner, lotilaner, and a salt of lotilaner.

16. A feed for controlling ticks in a canine, comprising an effective amount of mivorilaner or salt of mivorilaner when administered to said canine for a period of time selected from the group consisting of at least one week and at least two weeks at a frequency of substantially daily, wherein the effective amount is a dose that is suboptimal for controlling a tick infestation in a canine when administered as a single dose once per month, but over time at the substantially daily frequency, results in efficacious control of tick infestations.

17. The feed of claim 16, wherein said mivorilaner or salt thereof is provided in the feed or chew in an amount selected from the group consisting of: between about 0.001 to about 0.4 percent by weight of the feed; and between about 0.002 to about 0.24 percent by weight of the feed or the chew.

18. The feed of claim 16, wherein said mivorilaner or salt thereof is administered to said canine in an amount selected from the group consisting of: between about 0.21 mg/kg and about 3.33 mg/kg of body weight of said canine; and between about 0.33 mg/kg and about 1.5 mg/kg of body weight of said canine.

* * * * *